US008166452B2

(12) United States Patent
Kinnucan, Jr. et al.

(10) Patent No.: US 8,166,452 B2
(45) Date of Patent: Apr. 24, 2012

(54) USER-DEFINED HIERARCHIES OF USER-DEFINED CLASSES OF GRAPHICAL OBJECTS IN A GRAPHICAL MODELING ENVIRONMENT

(75) Inventors: Paul F. Kinnucan, Jr., Milton, MA (US); Pieter J. Mosterman, Framingham, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1257 days.

(21) Appl. No.: 11/890,153

(22) Filed: Aug. 3, 2007

(65) Prior Publication Data

US 2008/0092111 A1    Apr. 17, 2008

Related U.S. Application Data

(63) Continuation of application No. 11/581,940, filed on Oct. 17, 2006, now Pat. No. 7,934,194.

(51) Int. Cl.
  *G06F 9/44* (2006.01)
  *G06F 3/00* (2006.01)
  *G06F 3/048* (2006.01)
  *G06F 7/60* (2006.01)
  *G06F 7/48* (2006.01)
(52) U.S. Cl. ........ 717/105; 717/109; 717/113; 715/713; 715/771; 703/2; 703/6; 703/14; 703/22
(58) Field of Classification Search .................. None
  See application file for complete search history.

(56) References Cited

U.S. PATENT DOCUMENTS

| | | | | |
|---|---|---|---|---|
| 6,002,867 | A * | 12/1999 | Jazdzewski | 717/105 |
| 6,278,464 | B1 * | 8/2001 | Kohavi et al. | 345/440 |
| 6,868,526 | B2 * | 3/2005 | Singh | 715/763 |
| 7,098,589 | B2 | 8/2006 | Erchak et al. | |
| 7,272,818 | B2 * | 9/2007 | Ishimitsu et al. | 717/108 |
| 7,533,347 | B2 | 5/2009 | Santori et al. | |
| 7,539,604 | B1 | 5/2009 | Stothert et al. | |
| 7,567,890 | B1 | 7/2009 | Warlock | |
| 7,765,529 | B1 * | 7/2010 | Singh et al. | 717/134 |
| 7,793,273 | B2 * | 9/2010 | Mercer et al. | 717/141 |
| 7,835,895 | B1 * | 11/2010 | Orofino et al. | 703/13 |
| 2002/0042892 | A1 * | 4/2002 | Gold | 714/6 |
| 2002/0113816 | A1 * | 8/2002 | Mitchell et al. | 345/734 |
| 2002/0138684 | A1 * | 9/2002 | Liron | 710/317 |
| 2003/0016246 | A1 | 1/2003 | Singh | |
| 2003/0132965 | A1 * | 7/2003 | Santori et al. | 345/763 |
| 2005/0138601 | A1 * | 6/2005 | Simonoff et al. | 717/105 |
| 2005/0205884 | A1 | 9/2005 | Kim et al. | |
| 2005/0257195 | A1 | 11/2005 | Morrow et al. | |
| 2005/0278162 | A1 | 12/2005 | Ciolfi et al. | |

(Continued)

OTHER PUBLICATIONS

Miles, Russ et al., "Learning UML 2.0," O'Reilly Media, Inc. (2006).
Modelica Association, "Modelica®—A Unified Object-Oriented Language for Physical Systems Modeling," retrieved online: http://www.modelica.org/documents/ModelicaSpec22.pdf.

(Continued)

*Primary Examiner* — Issac Tecklu
(74) *Attorney, Agent, or Firm* — Nelson Mullins Riley & Scarborough LLP

(57) ABSTRACT

The present invention allows a user to graphically define a hierarchy of user-defined, executable classes of graphical objects that can be implemented in a graphical model. The present invention supports the features of inheritance, abstraction and polymorphism. Further, descendant classes of graphical objects can graphically extend the behavior and/or structure of ancestor classes of graphical objects.

36 Claims, 26 Drawing Sheets

U.S. PATENT DOCUMENTS

| | | | |
|---|---|---|---|
| 2006/0168182 A1 | 7/2006 | Fuller et al. | |
| 2006/0202226 A1 | 9/2006 | Weisbuch et al. | |
| 2006/0259871 A1* | 11/2006 | Washington et al. | 715/763 |
| 2006/0271908 A1* | 11/2006 | Bargh et al. | 717/100 |
| 2006/0294505 A1 | 12/2006 | Englehart | |
| 2007/0106489 A1 | 5/2007 | Eryilmaz | |
| 2007/0156374 A1 | 7/2007 | Woodring | |
| 2007/0283322 A1* | 12/2007 | Hsu et al. | 717/113 |
| 2008/0034310 A1 | 2/2008 | Kodosky et al. | |
| 2008/0228461 A1 | 9/2008 | Calvez | |
| 2010/0058296 A1* | 3/2010 | Nattinger | 717/125 |
| 2011/0083091 A1* | 4/2011 | Huin et al. | 715/771 |

OTHER PUBLICATIONS

Object Management Group, "Unified Modeling Language: Superstructure," version 2.0, retrieved online: http://www.omg.org/docs/formal/05-07-04.pdf.

Taivalsaari, Antero, "On the Notion of Inheritance," *AMC Computing Surveys*, vol. 28(3):438-479 (1996).

International Search Report for Application No. PCT/US2007/022126, dated Apr. 23, 2008.

European Office Action for Application No. 07852812.2, dated Jul. 6, 2010.

* cited by examiner

_US 8,166,452 B2_

USER-DEFINED HIERARCHIES OF USER-DEFINED CLASSES OF GRAPHICAL OBJECTS IN A GRAPHICAL MODELING ENVIRONMENT

RELATED APPLICATIONS

The present application claims the benefit under 35 U.S.C. §120 and is a continuation of U.S. application Ser. No. 11/581,940, filed Oct. 17, 2006 now U.S. Pat. No. 7,934,194 which is hereby incorporated herein by reference in its entirety

FIELD OF THE INVENTION

The present invention is related generally to computing devices and more particularly to a user-defined hierarchy of user-defined classes of graphical objects in a graphical modeling environment.

BACKGROUND

Graphical modeling has spawned a variety of software products such as Simulink® and Stateflow® from The MathWorks, Inc. of Natick, Mass., that cater to various aspects of dynamic system simulation, analysis and design. Such products allow users to perform various types of tasks including constructing system models through a user interface that allows drafting of block diagram and state diagram models. The products also allow augmentation of a pre-defined set of blocks or states with custom user-defined blocks or states and the use of the block diagram model to compute and trace the temporal evolution of the dynamic system ("executing" the block diagram). In addition, the products enable automatic production of either deployable software systems or descriptions of hardware systems that exhibit the behavior defined by either an entire model or portions of the model (referred to herein as "code generation").

Some conventional graphical modeling environments allow elements to be cloned and copied and allow users to develop custom elements. While these functions provide a user with extended capabilities, they do not exploit such graphical representations to simplify the creation and maintenance of models of complex systems. With some conventional graphical modeling environments, users must either create separate models for each member of a family of related systems or include complex conditional logic in a model to account for variations in behavior among the related systems. The first option entails considerable duplication of effort and the second option leads to complex, error-prone models that are difficult to create and maintain.

SUMMARY OF THE INVENTION

One embodiment of the present invention is a graphical modeling environment that allows a user to depict graphically the common features and variations among a family of related systems and to use those depictions to create simple, high-level models of systems, with the modeling environment automating the process of applying high-level models to the simulation of specific variants of a system or family of systems. Such a graphical modeling environment may allow a user to capture all aspects of a family of systems or system variants in a single model without having to resort to complex switching logic and thus greatly facilitates creation and maintenance of models of complex, real-world systems.

Embodiments of the present invention allow a user to graphically specify classes of executable graphical objects that may be implemented in a graphical model. Embodiments of the present invention provide the ability for classes of graphical objects to inherit aspects from other classes of graphical objects. The inherited aspects may be modifiable in the classes of graphical objects that inherit the aspects. Graphical indicators may be used to indicate which of the inherited aspects may be modified and/or which of the graphical models may not be modified. Further embodiments of the present invention allow descendant classes of graphical objects to extend the behavior and/or structure of ancestor classes of graphical objects. Embodiments of the present invention also allow a user to define abstract classes of graphical objects. Further, embodiments of the present invention allow the user to take advantage of the feature of polymorphism to create models with variable graphical objects of a parent class that are dynamically replaced with instances of descendant classes of graphical objects during execution of the model.

In one aspect, a method for generating a hierarchy of user-defined classes of graphical objects is disclosed. The method includes the steps of generating a first class of graphical objects and generating at least one descendant class of graphical objects that is a subclass of the first class of graphical objects in the hierarchy of classes of graphical objects. At least the first class or at least one descendant class of graphical objects can be instantiated in an executable graphical model of a dynamic system.

In another aspect, a computing system is disclosed. The computing system includes a graphical modeling environment for generating a hierarchy of user-defined classes of graphical objects. The graphical modeling environment includes a first user interface for defining a class of graphical objects and a second user interface for developing the hierarchy of user-defined classes of graphical objects.

In yet another aspect, a computer-readable medium holding instructions for generating a user-defined hierarchy of user-defined classes of graphical objects in a graphical modeling environment is disclosed. The instructions enable the steps of generating a first class of graphical objects and generating at least one descendant class of graphical objects that is a subclass of the first class of graphical objects in the hierarchy of classes of graphical objects. At least the first or at least one descendant class of graphical objects can be instantiated in an executable graphical model of a dynamic system.

In still another aspect, a method for generating a hierarchy of user-defined classes of graphical objects is disclosed. The method includes the steps of providing a first class of graphical objects and providing at least one descendant class of graphical objects that is a subclass of the first class of graphical objects for the hierarchy of classes of graphical objects. The method also includes the step of inheriting, with the at least one descendant class of graphical objects, aspects of the first class of graphical objects. The method further includes the step of depicting, graphically, contents of the at least one descendant class of graphical objects, wherein the contents include the aspects that are inherited from the first class of graphical objects.

In a further aspect, a computer-readable medium holding instructions for generating a user-defined hierarchy of user-defined classes of graphical objects in a graphical modeling environment is disclosed. The instructions enable the steps of providing a first class of graphical objects and providing at least one descendant class of graphical objects that is a subclass of the first class of graphical objects for the hierarchy of classes of graphical objects. The instructions also enable the step of inheriting, with the at least one descendant class of graphical objects, aspects of the first class of graphical objects. The instructions further enable the step of depicting, graphically, contents of the at least one descendant class of graphical objects, wherein the contents include the aspects that are inherited from the first class of graphical objects.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
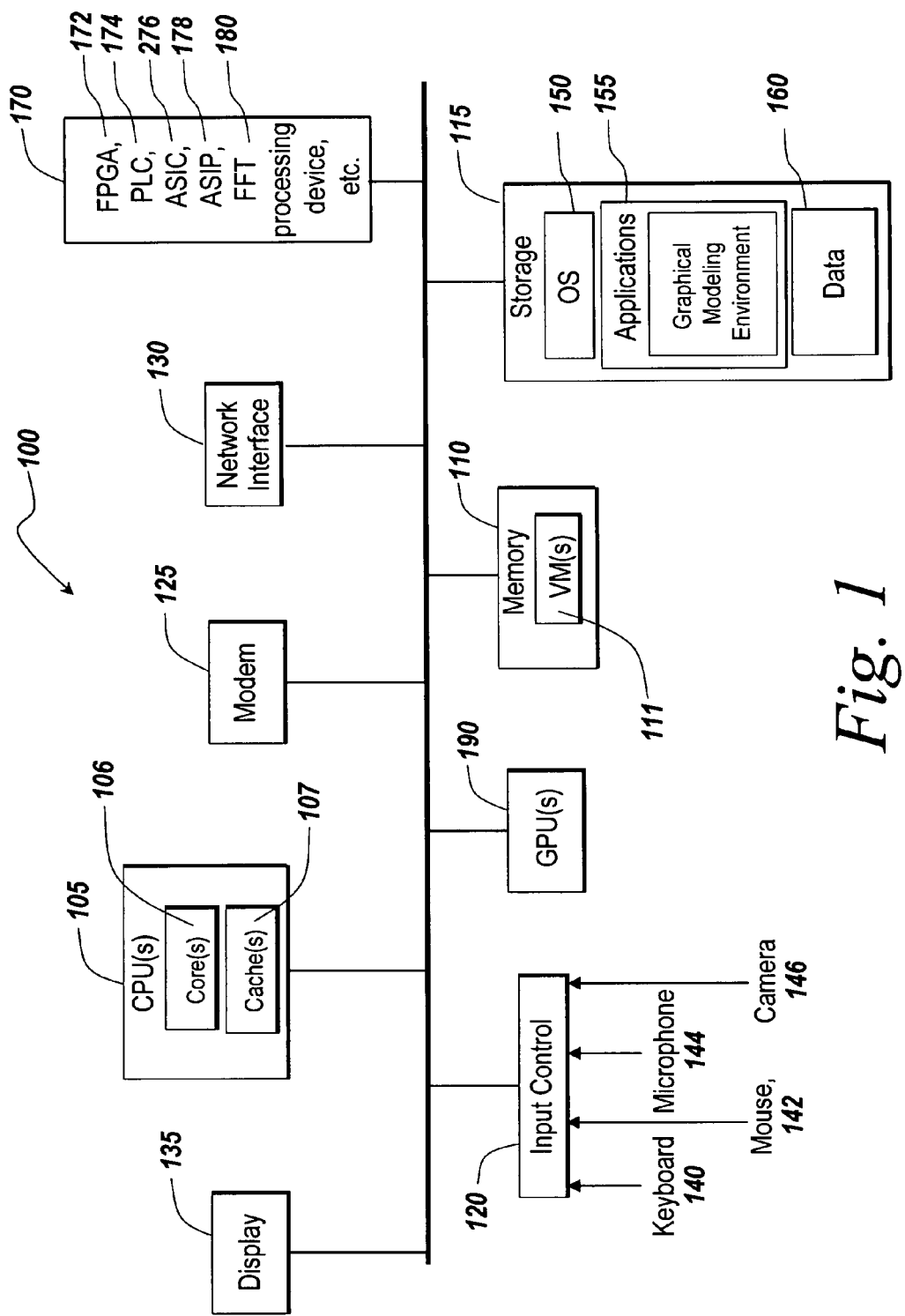
FIG. 1 depicts an exemplary computing device suitable for practicing an embodiment of the present invention.

Embodiments of the present invention allow a user to graphically define a hierarchy of user-defined classes of graphical objects and the behavior and properties of the classes. Instances of the classes of graphical objects may be executable and may be implemented in an executable graphical model. The hierarchy of classes of graphical objects may include one or more root classes of graphical objects. The hierarchy of classes of graphical objects may also include one or more classes of graphical objects that are descendants of the root class or root classes. The hierarchy may include parent classes and children classes, such that the hierarchy of classes of graphical objects may include multiple generations and a class of graphical objects may be both a parent and a child class. Further, embodiments of the present invention permit a class to have multiple parents. Such an embodiment is said to support multiple inheritance. A child class of graphical objects is a direct descendant of its parent classes of graphical objects.

Embodiments provide the ability for descendant classes of graphical objects, such as children classes of graphical objects, to inherit aspects from an ancestor class of graphical objects, such as a parent class of graphical objects. The modeling environment may specify which aspects of the parent class of graphical objects are inherited by the children classes of graphical objects. The various embodiments may also allow a user to specify or restrict which of the aspects of the parent class of graphical objects are inherited by the children classes and/or which inherited aspects may be modified or may not be modified. The various embodiments may provide a graphical indication of the inherited aspects as well as a graphical indication of which of the inherited aspects may be modified and/or which of the graphical models may not be modified.

The term "aspect" as referred to herein relates to various parts, features or characteristics of a class. For example, an aspect of a class can be a functional aspect, a non-functional aspect, diagrams that depict the behavior of the class, graphical affordances or any other part of a class. Some examples of functional aspects can include, but are not limited to parameters, values or data. Some examples of non-functional aspects can include, but are not limited to memory usage, annotations, class descriptions, graphical object descriptions, an execution time that is required or electromagnetic interference. Graphical affordances can be, but are not limited, graphical objects, signals and other various graphical instances.

Embodiments further allow the descendant classes of graphical objects to extend the behavior and/or structure of the parent class of graphical objects. Extensions to the parent class of graphical objects can include, but are not limited to element replacement, element addition, element insertion or redefinition of element properties.

In addition, the embodiments of the present invention allow a user to define abstract classes of graphical objects. An abstract class of graphical objects refers to a class that is not fully specified, such that the abstract class of graphical objects may not be instantiated in a graphical model. The descendant classes of graphical objects in the hierarchy of classes of graphical objects can provide aspects to an abstract class such that the parent class is fully specified by at least one child class. A class of graphical objects that is fully specified, such that it can be instantiated in a graphical model, will be referred to herein as a "concrete class" of graphical objects.

Further, the embodiments of the present invention allow the user to take advantage of polymorphism. Polymorphism dynamically replaces an occurrence of a parent class in a model with instances of descendant classes, where the instances that replace the parent class are selected based on the current state of the system model or the current state of the environment. The conditions for replacement may be specified by the class of the instance. Polymorphism allows a user to create abstract models of systems, such as dynamic systems. The abstract models may be as accurate and efficient to simulate as concrete models, but may take less time to create and may be easier to understand and maintain. For example, polymorphism allows a user to replace a family of models, each efficiently modeling the behavior of a system over a portion of its operating range, with a single high-level model that efficiently represents the behavior of the system over its entire range. During simulation, the polymorphic model reconfigures itself when it enters a new operating range to model the system's behavior efficiently over that range. Similarly, polymorphism facilitates creation of self-configuring models of families of dynamic systems, such as, for example, a model of a family of automobiles having differing engine, transmission, and braking options. Selecting a set of options causes the model to configure itself to simulate a vehicle having the selected set of options.

FIG. 1 is an exemplary computing device 100 suitable for practicing the embodiments of the present invention. One of ordinary skill in the art will appreciate that the computing device 100 is intended to be illustrative and not limiting of the present invention. The computing device 100 may take many forms, including but not limited to a personal computer, workstation, server, network computer, quantum computer, optical computer, bio computer, Internet appliance, mobile device, a pager, a tablet computer, a smart sensor, a smart actuator, and the like.

The computing device 100 may be electronic and may include a Central Processing Unit (CPU) 105, memory 110, storage 115, an input control 120, a modem 125, a network interface 130, a display 135, etc. The CPU 105 may control each component of the computing device 100 to provide components of a graphical modeling environment 300, which is discussed in more detail below. The memory 110 may temporarily store instructions and data and may provides them to the CPU 105 so that the CPU 105 may operate the computing device 100 and run the components of the graphical modeling environment 300.

Optionally, the computing device 100 may include multiple CPUs 105 for executing software loaded in the memory 110, and other programs for controlling system hardware. Each of the CPUs 105 can be a single or a multiple core processor 106. The code loaded in the memory 110 may run in a virtualized environment, such as in a Virtual Machine (VM) 111. Multiple VMs 111 may be resident on a single processor. Also, part of the application could be run in hardware 170, including, for example, a field programmable gate array (FPGA) 172, a programmable logic controller (PLC) 174, application specific integrated circuit (ASIC) 176, an application specific instruction-set processor (ASIP) 178, a system-on-chip (SoC) 180, a multiple-processor system on chip (MPSoC) 182, a Fast Fourier Transform (FFT) processing device 184, etc. Further, the part of the applications may be run on analog electronic devices or other resources may be used to run part of the application, such as graphics processing units (GPUs) 190.

The storage 115 may contain software tools for applications. The storage 115 can include code 150 for the operating system (OS) of the device 100, code 155 for applications running on the operation system including the applications for the graphical modeling environment 300 and data 160 generated from the graphical modeling environment 300. Those of ordinary skill in the art will appreciate that parts of the applications can be stored in the CPU cache 107 or memory 110 as well, much like the data, and even the OS, or they can be stored elsewhere, such as on a remote storage device.

The input control 120 may interface with a keyboard 140, a mouse 142, a microphone 144, a camera 146, such as a web camera, and/or other input devices. The computing device 100 may receive, through the input control 120, input data, such as the input data for developing a graphical model in the graphical modeling environment 300. The computing device 100 may display on the display 135 user interfaces for displaying the data generated from the graphical modeling environment 300.

Figure 2:
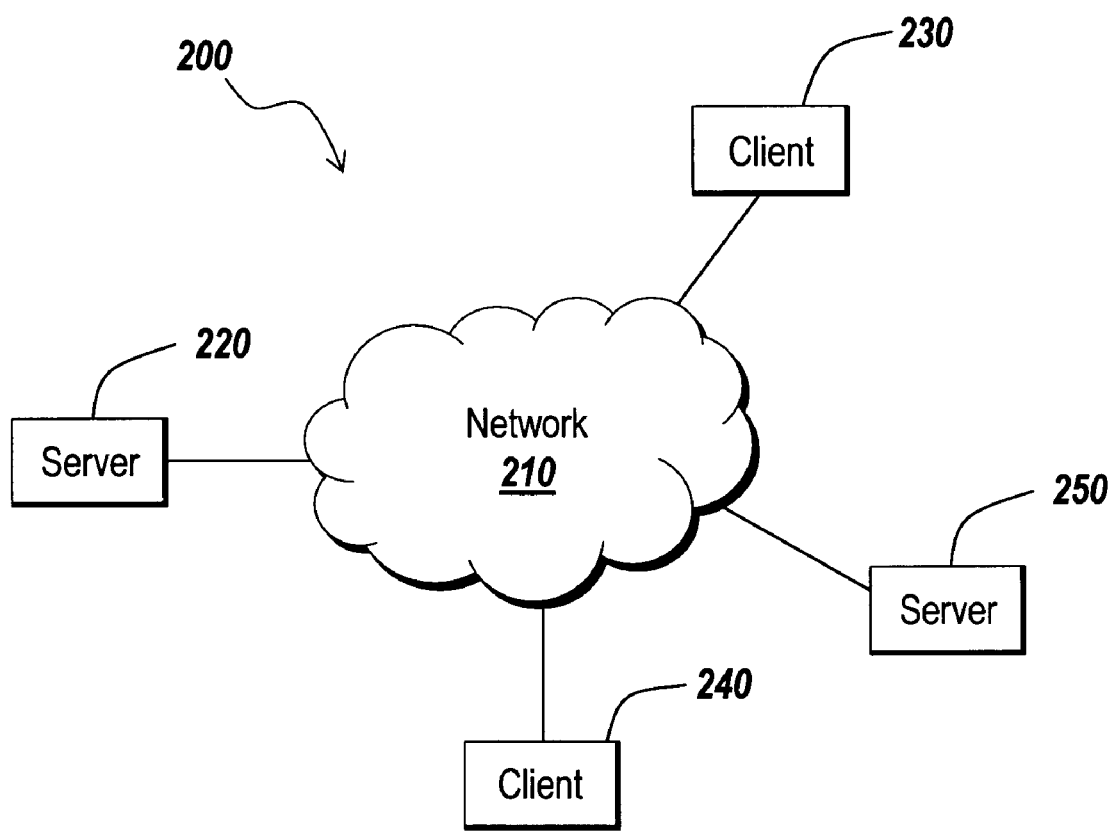
FIG. 2 depicts an exemplary distributed system suitable for a distributed implementation of an embodiment.

FIG. 2 is an exemplary network environment 200 suitable for the distributed implementation of the various embodiments. The network environment 200 may include one or more servers 220 and 250 coupled to clients 230 and 240 via a communication network 210. The network interface 130 and the modem 125 of the computing device 100 enable the servers 220 and 250 to communicate with the clients 230 and 240 through the communication network 210. The communication network 210 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 200, the servers 220 and 250 may provide the clients 230 and 240 with software components or products under a particular condition, such as a license agreement. The software components or products may include those for providing the graphical modeling environment 300. In one example, the client 240 may implement a graphical model of a dynamic system using a software component provided by the server 220 and send the server 220 the model for simulation. The server 220 then returns the simulation results to the client 240 and the client 240 may subsequently display the data to the user with the information on the data.

Figure 3:
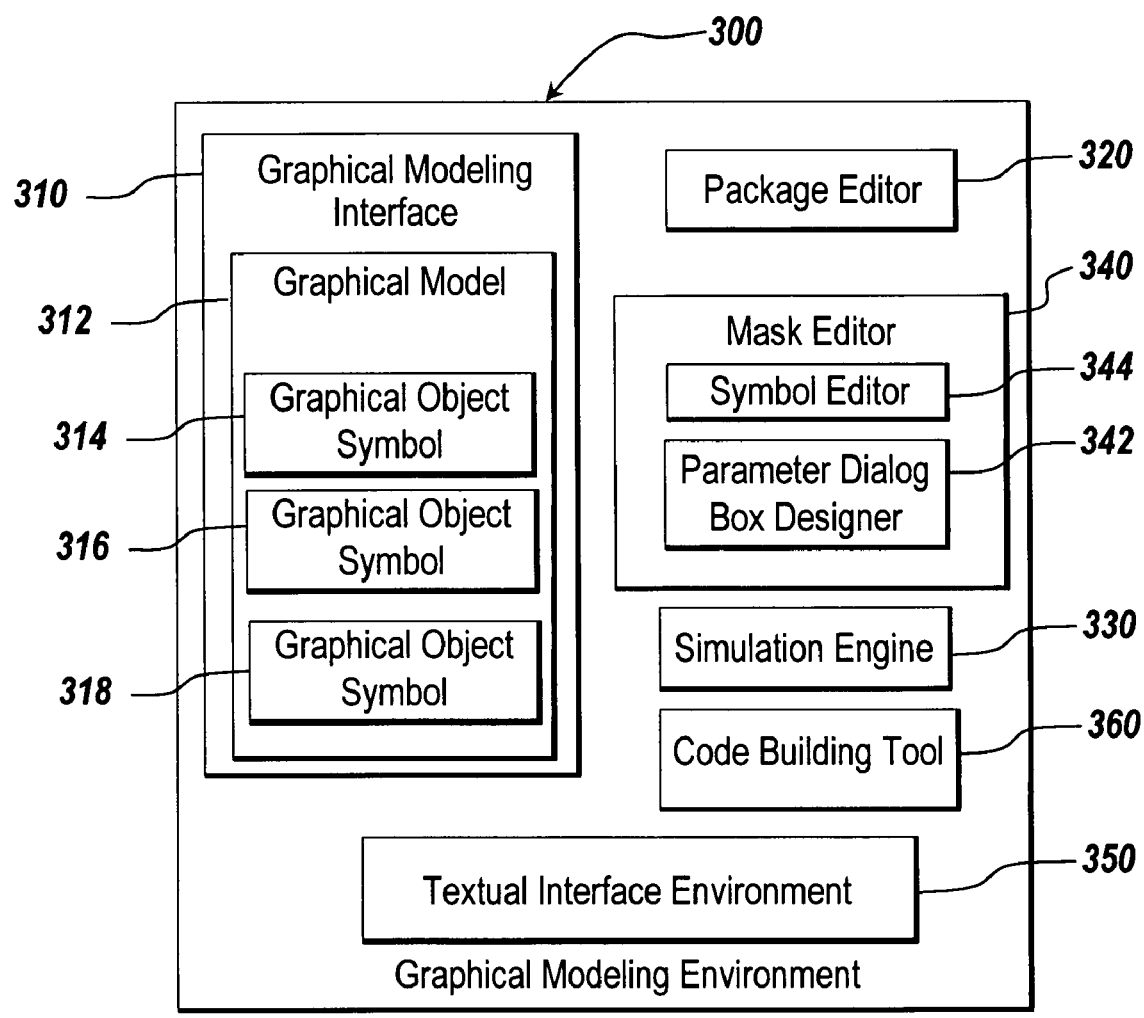
FIG. 3 depicts a high-level block diagram of an exemplary graphical modeling environment that may be used for implementing an embodiment of the present invention.

FIG. 3 is a high-level block diagram of the graphical modeling environment 300 for modeling, simulating, and analyzing dynamic systems. The graphical modeling environment 300 may include a graphical modeling interface 310, a package editor 320, a mask editor 340, a simulation engine 330, a textual interface 350, and a code building tool 360. A brief overview of the components of the graphical modeling environment 300 is discussed immediately below, and various components of the graphical modeling environment are discussed in more detail throughout the remainder of this document.

The graphical modeling environment 300 allows a user to develop a user-defined class of graphical objects with the graphical modeling interface 310. Using the graphical modeling interface 310, a user can create a graphical model that defines a class of graphical objects. The user may use predefined elements or user-defined elements to define a class of graphical objects.

The graphical modeling interface 310 can also be used to develop graphical models of dynamic systems. A user can develop a graphical model 312 with the graphical modeling interface 310 that includes a first graphical object 314, a second graphical object 316 and a third graphical object 318. The graphical objects can be symbols of predefined elements, user-defined elements or symbols of user-defined classes of graphical objects that are developed in accordance with the various embodiments.

The textual interface 350 allows a user to develop a user-defined element with a sequence of commands in a textual language. A sequence of commands developed using the textual interface 350 can be included as an element in a graphical model. The textual interface 350 can also facilitate debugging and profiling of a graphical model or the modeling environment may include a graphical debugger and profiler.

The package editor 320 allows a user to develop a hierarchy of user-defined classes of graphical objects. For example, the user may create a new class of graphical objects with the package editor 320 and define the new class of graphical objects using the graphical modeling interface 310. The user can develop a mask, or user-interface, for instances of the class of graphical objects using the mask editor 340.

The mask editor 340 allows a user to develop a symbol that serves as a graphical representation of an instance of the class of graphical objects in a model as well as other aspects of the user interface for instances of the class of graphical objects. The graphical modeling interface 310 allows a user to develop a graphical model 312 as well as graphical definitions of the behavior of user-defined classes of graphical objects.

The simulation engine 330, of the graphical modeling environment 300, communicates with the graphical modeling interface 310. The simulation engine 330 can receive a graphical model such as a block diagram model, state diagram model, mechanical system model, etc., that is generated using the graphical modeling interface 310. The simulation engine 330 may convert the model created in the graphical modeling interface 310 to an executable form, known as the compiled model, and then may repetitively execute the compiled model at successive time steps from a simulation start time to a stop time specified by the user or until the simulation is interrupted.

The execution of a graphical model may occur using an executable, where the graphical modeling environment 300 may translate the entire model to a lower level language. Alternatively, the execution may occur on an in-memory version of the graphical model. In this case, the model may be translated, as necessary for the execution of the graphical model.

Further, the graphical modeling environment 300 may determine an order of execution based on a relationship between elements in a graphical model. To determine the order of execution, the elements in the graphical model may specify the existence of any input dependencies, such that the output of the element cannot be computed before the input to the element is available. This approach enables the graphical modeling environment 300 to determine the order of execution without requiring the graphical modeling environment 300 to know the details of equations internal to the elements.

The code building tool 360 can be used to generate code, such as source code, object code, a compiled executable, or library, for forming an executable of a graphical model provided by the graphical modeling interface 310. The code building tool 360 can also be used to generate a hardware description language representation from the graphical model or from parts of the graphical model. The code building tool 360 may comprise a code building tool such as Real-Time Workshop® from The MathWorks, Inc. of Natick, Mass., or substantially any software component that may be necessary to generate executable code, instructions, etc., in a programming language such as Java, C, C++, etc., or a hardware description language such as Verilog, SystemVerilog or VHDL (very high speed integrated circuit hardware description language).

The code building tool 360 can generate source code for the execution of a graphical model that is provided by the graphical modeling interface 310 and may compile the source code into object code and build an executable program, library or any other form of executable instructions. The code may be designed to run on any processor, microprocessor, dual-core processor, multi-core processor, cluster of processors, operating system, computational hardware device or component of a computational hardware device. In one embodiment, the code may comprise embedded code targeted to run on any type of embedded system. Additionally, the code can be customized to run on a specific target hardware platform. For example, the code generated may include fixed-point code to run on a fixed-point processor or code can be generated to emulate fixed-point behavior on a floating-point processor.

The graphical model may include directives as to how the code should be generated. For example, elements in the graphical model can be directed to have a corresponding function to be generated in the code with an argument list and name as directed. This function may be reused by other graphical model elements with the same functionality.

Further, the code building tool 360 may apply optimizations such as expression folding, loop unrolling, function inlining, function outlining, etc., to the generated code. The generated code can be that of a programming language such as Java, C, C#, C++, etc., but can also be that of a hardware description language such as Verilog, SystemVerilog, or VHDL. The generated code can include abstract classes that may be partially specified and that may resemble an instance of a class of graphical objects in the model. A mapping may be provided between the generated code and portions of the hierarchy of classes of graphical objects.

Conversely, code can be read by the graphical modeling environment 300 to create corresponding elements in a graphical model. In one example, an include file that contains a struct definition can be read by the graphical modeling environment 300 and a corresponding bus definition may be created in the graphical model from the struct definition. In another example, memory locations of variables in the code may be determined and a corresponding location or reference to the memory locations can be provided in the graphical model.

One of ordinary skill in the art will appreciate that the components of the graphical modeling environment 300 may be provided on the same computing device, as described above with reference to FIG. 1, or alternatively, the components of the graphical modeling environment 300 may be coupled to each other via a communication network, as described above with reference to FIG. 2.

The graphical modeling environment 300 of various embodiments will be described solely for illustrative purposes relative to modeling environments provided by The MathWorks, Inc. of Natick Mass. More specifically, an extended version of Simulink® that enables developing hierarchies of user-defined classes of graphical objects and the Simulink® product family that can include, but is not limited to Stateflow®, SimMechanics, SimHydraulics™, SimEvents™, etc., from The MathWorks, Inc. of Natick, Mass. may serve as the graphical modeling environment 300.

Although the various embodiments will be described relative to a MathWorks-based application, one of ordinary skill in the art will appreciate that the present invention may be applied to other graphical modeling environments and technical computing environments, such as any graphical modeling or technical computing environments using software products of LabVIEW®, MATRIXx from National Instruments, Inc., Mathematica® from Wolfram Research, Inc., Mathcad of Mathsoft Engineering & Education Inc., Maple™ from Maplesoft, a division of Waterloo Maple Inc., Dymola from Dynasim AB of Lund, Sweden, Extend from Imagine That, Inc. of San Jose, Calif., Scilab™ and Scicos from The French National Institution for Research in Computer Science and Control (INRIA), Le Chesnay Cedex, France or MSC.Adams® from MSC.Software Corporation of Santa Ana, Calif. Furthermore, embodiments of the present invention may apply to any graphical or text-based modeling environment, such as one providing modeling with hardware description languages (HDL), physics modeling domains, Unified Modeling Language (UML) like Rhapsody® from iLogix, Inc. of Toronto, Canada or Rational® from International Business Machines Corporation of Armonk, N.Y., or SysML like ARTiSAN Studio from ARTiSAN Software Tools, Inc of Beaverton, Oreg. or Rhapsody® from iLogix, Inc.

Simulink® is an example of a graphical modeling environment that allows users to implement graphical models such as block diagram models that can represent dynamic systems. Simulink® includes blocks that can be used in block diagram models of dynamic systems to implement functions commonly used in modeling of dynamic systems. These blocks include, but are not limited to continuous and discrete dynamics blocks, such as integration and unit delay; algorithmic blocks, such as sum, product, and lookup tables; and structural blocks, such as multiplexers, switches, and signal, bus selectors and 'Merge' blocks. Simulink® also provides blocks and options to control the memory layout of the compiled version of the model and of generated code. These block and options can be used to, for example, store related values in contiguous memory.

A user can alter these predefined blocks or create customized blocks. Simulink® may be used, for example, to model systems for aerospace, communications, signal processing, mechanical systems and electrical systems as well as other systems. A user may also implement user-defined blocks that contain programming language statements or instructions in the technical computing language of MATLAB® and/or state diagrams developed in Stateflow®. In this manner, a graphical model may comprise graphical and textual elements, and the textual elements can include any type of suitable text, such as any programming language including those that are dynamically typed and those that are vector based.

Further, Simulink® allows references to functionalities to be included in a graphical model. These references can be to compiled functionalities, represented as, for example, a shared library in binary form, and may also be references to portions of a model or to complete models. Model library facilities can provide containers for multiple elements of referenced functionalities. References to elements can utilize a standardized application program interface (API) such as an S-Function interface of Simulink®. This interface supports references to C code, ADA code, as well as MATLAB M-code.

A Simulink® user can develop models that include sample time parameters for individual blocks or for an entire model as well as data types for signals in the models. Further, Simulink® enables a block, for which a sample time and/or a data type is not specified, to infer the sample time and/or a data type from another block or model parameters. Such an inference may occur through propagation, where a block can inherit a sample time and/or a data type from a block that is connected to it.

A graphical model developed in Simulink® can include subsystems. A subsystem can provide help in the organizational aspects of a graphical model. A graphical model may be composed of levels of hierarchy, where each level is defined by a subsystem. A subsystem is part of the overall graphical model. In this manner, a top view of a hierarchical graphical model can provide a high-level view of the system with one or more elements of this top view each representing a subsystem. A user may descend into the subsystem view from the top level to view the details of the subsystem. The contents of the subsystem can also include a multitude of elements, and in turn, some of these elements may represent additional graphical models and details of further sub-systems. As such, a hierarchical model may be constructed with hundreds or more graphical models in a multitude of levels with hundreds of thousands of elements representing primitive and aggregate computations, algorithms, and operations.

Stateflow® is a graphical modeling environment that enables development of state diagram models that can be graphical representations of state machines, such as either an infinite state machine, a finite state machine, a probabilistic state machine, a non-deterministic state machine, etc., where states and transitions form the building blocks of a model of a system. Stateflow® can provide elements such as states, junctions, and functions, such as graphical functions of Simulink® and/or Stateflow® and can provide a graphical model or a block in a graphical model. A state diagram provided by Stateflow® can be restricted to represent a Moore or Mealy machine. Stateflow® further enables the generation of a hardware description representation of a state diagram and can restrict the hardware description language representation to a Moore or Mealy machine or can impose other restrictions. Stateflow® can also provide any other restrictions for the code generation process or in the development of the state diagrams. A user may also implement user specified states that contain programming language statements such as in C, instructions in the technical computing language of MATLAB® and/or blocks from Simulink®. Graphical elements for defining functions and truth tables may be implemented as well.

SimMechanics provides an example of a graphical modeling environment for design, analysis and simulation of rigid body machines and their motions, using the standard Newtonian dynamics of forces and torques. A user can model and simulate mechanical systems with a suite of tools to specify bodies and their mass properties, possible motions, kinematic constraints, coordinate systems, etc. SimMechanics allows a user to initiate and measure body motions. As a result, a user can impose kinematic constraints, apply forces/torques, integrate Newton's equations, measure resulting motions, etc., of a model of a system. SimMechanics machines can be organized hierarchically. For example, a SimMechanics machine may include subsystems and the subsystems can have ports that are specific to the mechanical physics domains. SimMechanics machines can also have bidirectional variables, where the input or output nature of the bidirectional variables can be specified by a user or derived by a compiler.

Using SimMechanics, a user can specify inertial properties, degrees of freedom, and constraints, along with coordinate systems to measure positions and velocities. The user can setup sensors and actuators to record and initiate body motions and/or apply forces/torques. Sensors and Actuators provide an interface between non-SimMechanics Simulink element and SimMechanics elements. SimMechanics elements can be interspersed with Simulink elements through the Sensors and Actuators and each SimMechanics machine can have its own environment settings, such as gravity. Force Elements in SimMechanics represent internal forces that require no external input. Sensor blocks can be used in SimMechanics to detect the motion of Bodies and Joints. Sensor block outputs are Simulink signals. A user can connect a Sensor block to a Simulink Scope block and display the motions in a system, such as positions, velocities, and accelerations, as functions of time. The Sensor output signals can be used to provide feedback to a mechanical system via Actuator blocks, to specify forces/torques and/or motions of bodies and joints in a model of a system.

Actuator blocks of SimMechanics may accept force/torque signals and may apply forces/torques on a body or joint from these signals. The force/torque signals can include Sensor block outputs that provide feedback in a model of a system. The force/torque signals may detect discrete locking and unlocking of Joints to implement discontinuous friction forces, and can specify the position, velocity, and acceleration of bodies or joints as explicit functions of time. Force Elements model internal forces between bodies or acting on joints between bodies. Internal forces depend only on the positions and velocities of the bodies themselves and are independent of external signals.

The elements described with regard to SimMechanics can pertain to other physics domains as well. For example SimHydraulics models can be organized hierarchically with specific ports for the hydraulics domain, much like, for example, SimPowerSystems and SimDriveline, which are also from The MathWorks, Inc. These ports are domain specific and connections between ports from different domains are syntactically prohibited.

The graphical modeling environment 300 can also interface with MATLAB® from the MathWorks, Inc. MATLAB® provides an intuitive language and a technical computing environment that enables the development of code. The MATLAB® environment integrates mathematical computing, visualization, and a technical language. MATLAB® provides mathematics and advanced graphical tools for data analysis, visualization, and algorithm and application development. MATLAB® further provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, FORTRAN, Java, etc., with the MATLAB® applications.

Figure 4:
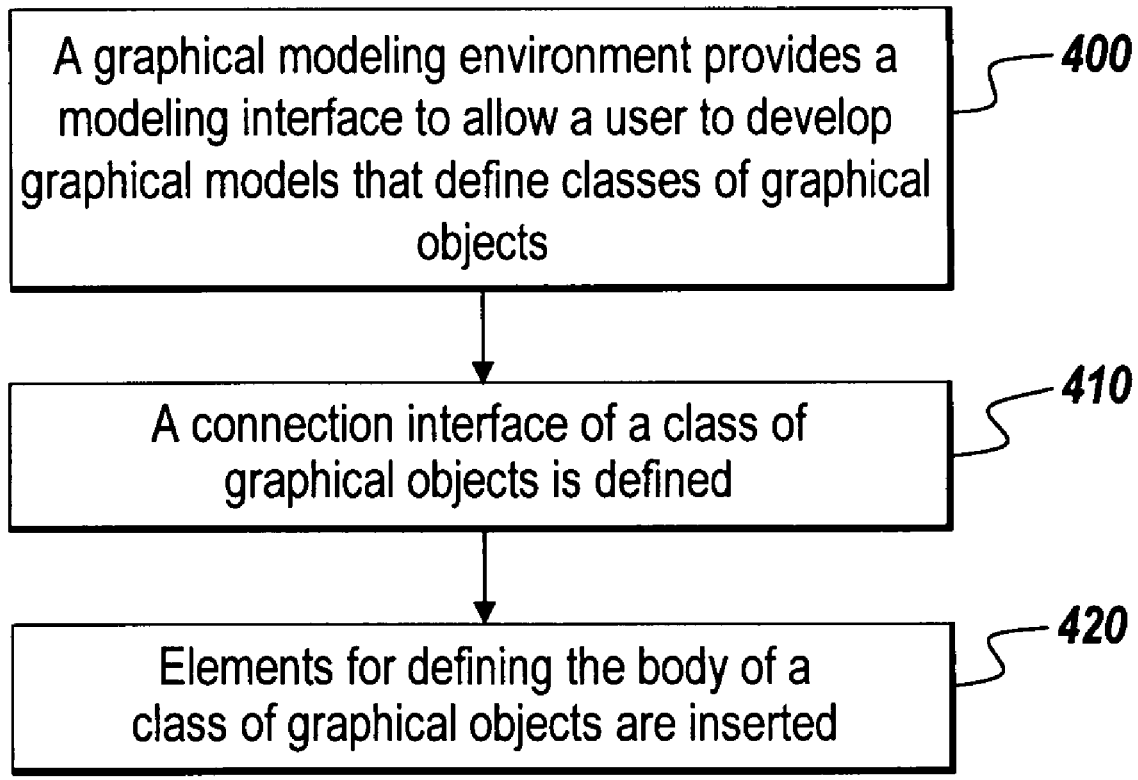
FIG. 4 is a flow diagram that illustrates exemplary steps creating a user-defined, executable class of graphical objects according to an embodiment.

FIG. 4 is a flow diagram that illustrates exemplary steps creating a user-defined class of graphical objects with the graphical modeling interface 310 in accordance with various embodiments. The graphical modeling environment 300 provides the graphical modeling interface 310 to allow a user to develop graphical models as well as to define the behavior or functionality of classes of graphical objects used to create such models (step 400). A graphical definition of the behavior of a class of graphical objects may be, for example, but is not limited to a block diagram implemented with Simulink® or a state diagram implemented with Stateflow®. Such a graphical definition of the behavior of a class of graphical objects is referred to herein as the body of the class's graphical definition to distinguish it from the graphical definition of the class's connection interface. The term class refers to a group of functionalities and behaviors that have common properties.

The modeling interface 310 allows a user to insert or add and connect elements to define the connection interfaces and bodies of instances of classes of graphical objects. The modeling interface 310 allows a user to define a connection interface for connecting instances of the class to other objects in a graphical model and optionally a body consisting of a graphical model that defines the behavior of the class of graphical objects as well as user-defined data types for data representations such as variables, constants and parameters used by the class of graphical objects.

The connection interface of the class of graphical objects can be defined by connections or ports such as input and output ports or connection ports (step 410). The graphical modeling interface may allow a user to define the connection interface of the class of graphical objects and can be used to create buses or other structured connections graphically. The graphical modeling interface 310 may provide a separate interface to allow the user to define the connection interface. A bus is a composite connection consisting of multiple elements of the same or different data types. To define the connection interface of a class of graphical objects, a user can add port elements to the body model of the class of graphical objects in the graphical modeling interface 310. A user can also define bus ports on the connection interface. For example, a user can specify a bus input port and a bus output port. These bus ports can be used to avoid having to reconnect polymorphic objects of a model that require different numbers or types of connections and to avoid having to recompile the model that includes polymorphic objects during simulation of the model.

The body of the class of graphical objects can be a graphical model that is composed of elements that may be interconnected. The elements that compose the body can be predefined or user-defined elements. The body defines the behavior of instances of the class of graphical objects and connects to the connection interface of the class of graphical objects. To add or insert elements in the body of a class of graphical objects, a user can select elements from element libraries or a user can develop their own user-defined elements (step 420).

Figure 5:
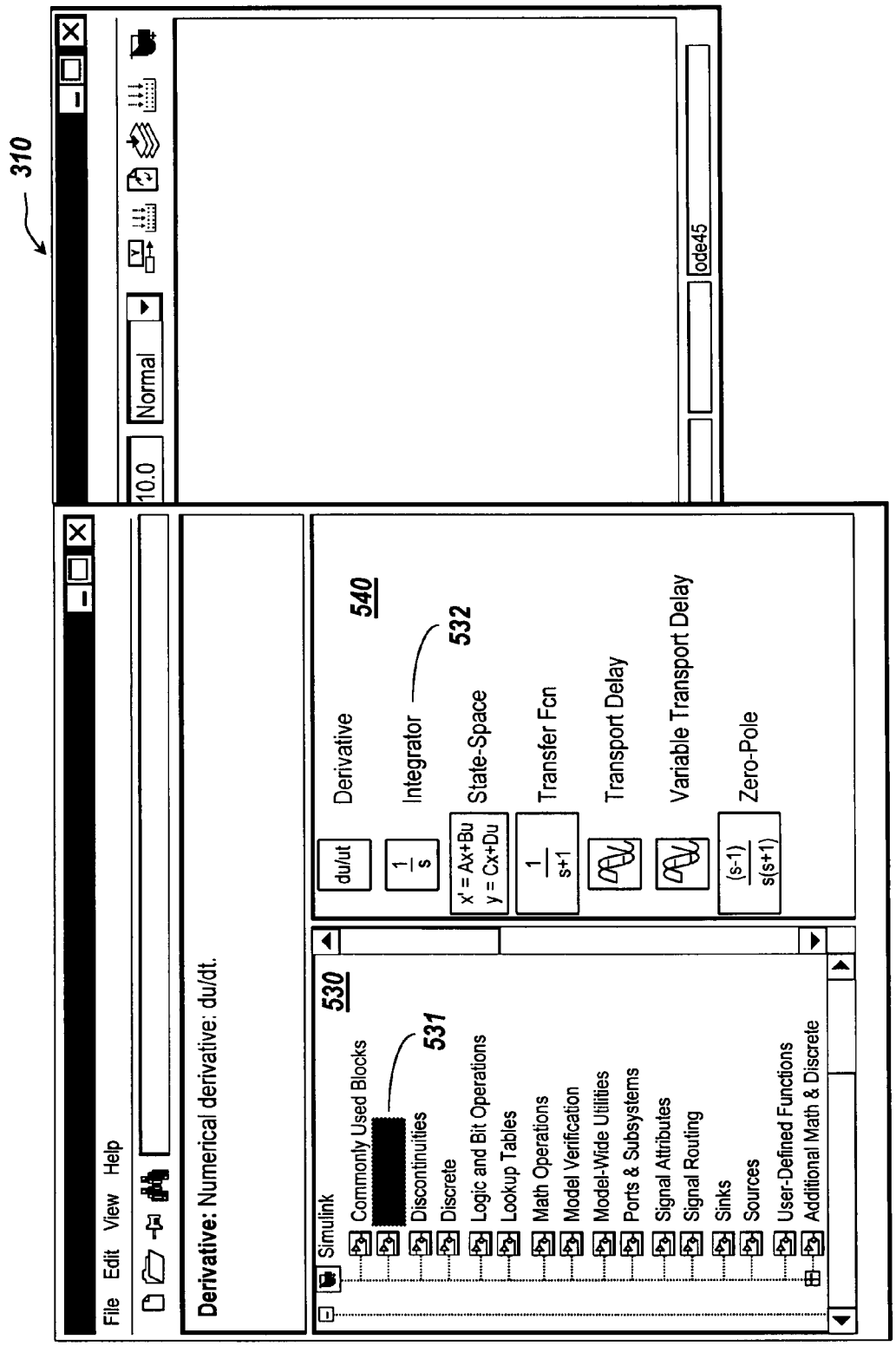
FIG. 5 is an exemplary graphical modeling interface of the graphical modeling environment of FIG. 3.

Referring to FIG. 5, the user adds an element using a list of element libraries 530, where each library includes elementary elements that can be used to develop models of system, such as dynamic systems. To add an element for defining the body of the class of graphical objects, the user can select a particular library, which allows the user to view the elements contained in the library. For example, if the user wanted to add an integrator element 532 to the body of the class of graphical objects the user can select the 'Continuous' library 531, which causes a list of elements 540 of the Continuous library 531 to appear. The user can add the integrator element 532 to the body of the class of graphical objects by double clicking on the integrator element 532 with a pointing device or can drag-and-drop the integrator element 532 in the modeling interface 310 using the pointing device. After selecting the integrator element, the element appears in the modeling interface 310. The user can connect various elements that have been added to the graphical user interface of the modeling interface 310 to allow interaction between the various elements.

FIGS. 6A-D depict an exemplary representation of the package editor 320. The package editor 320 provides a user with a graphical interface that allows a user to graphically specify classes of graphical objects in a hierarchy of classes of graphical objects. The hierarchy of classes of graphical objects developed in the package editor can be referred to as a package, such that a package is a collection of classes. To develop the user-defined hierarchy of classes of graphical objects, the user uses the package editor 320 to add classes of graphical objects to the package.

Figure 7:
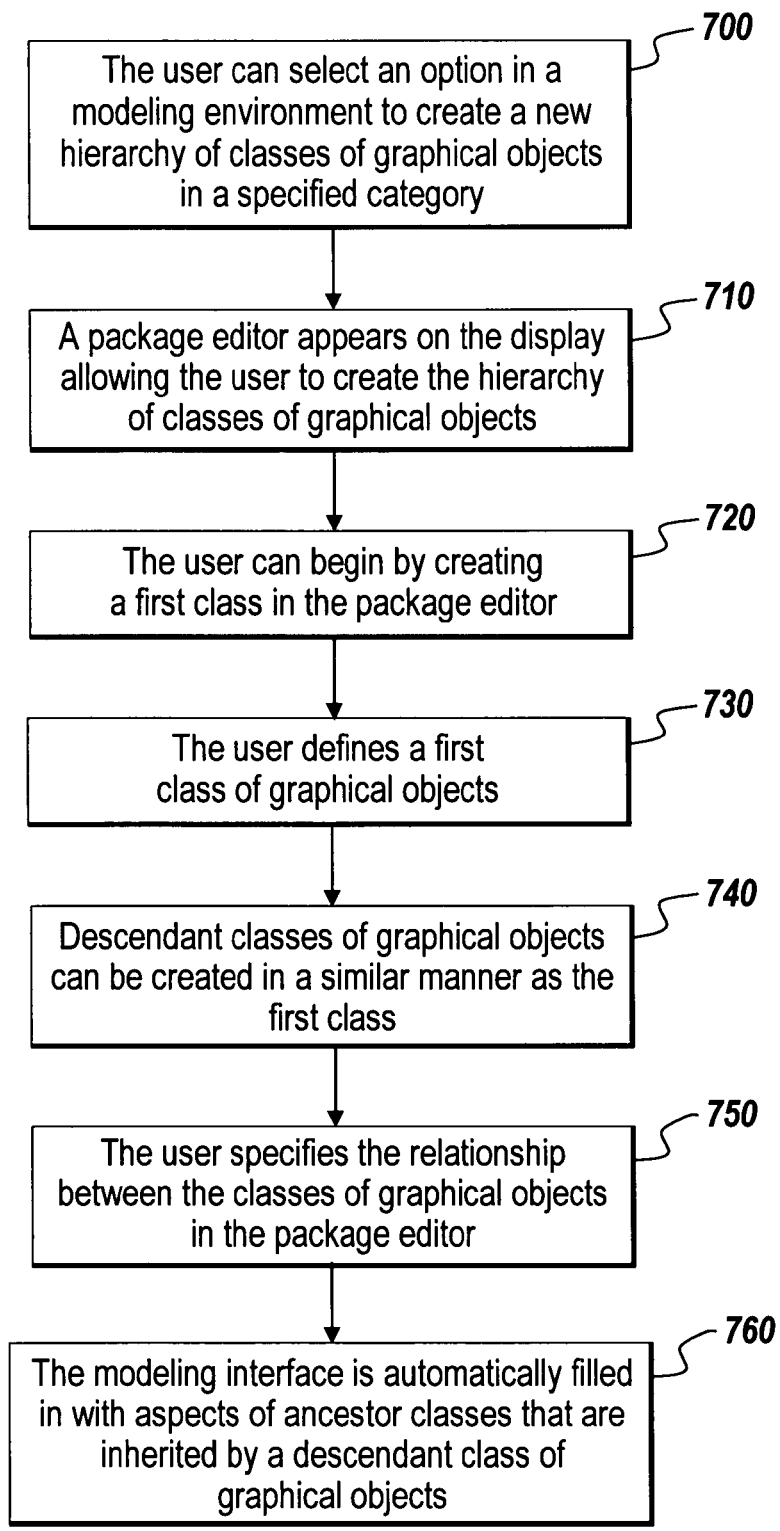
FIG. 7 is a flow diagram that illustrates exemplary steps developing a hierarchy of classes of graphical objects for a specified category.

FIG. 7 is a flow diagram that illustrates exemplary steps developing a hierarchy of classes of graphical objects for a specified category. The user can select an option in the graphical modeling environment 300 to create a new hierarchy of classes of graphical objects in the specified category (step 700). The package editor 320 appears on the display and allows the user to create the hierarchy of classes of graphical objects (step 710). To begin developing a hierarchy of user-defined classes of graphical objects, the user can create a root class (step 720). The root class is a class of graphical objects that has no ancestors and is at the top of the class hierarchy. In various embodiments, all other classes of graphical objects in the hierarchy of classes of graphical objects are descendants of the root class. In embodiments that support multiple inheritance, a class hierarchy may have multiple root classes and multiple parent classes for a single child class. Multiple inheritance is discussed in more detail below.

Figure 6A:
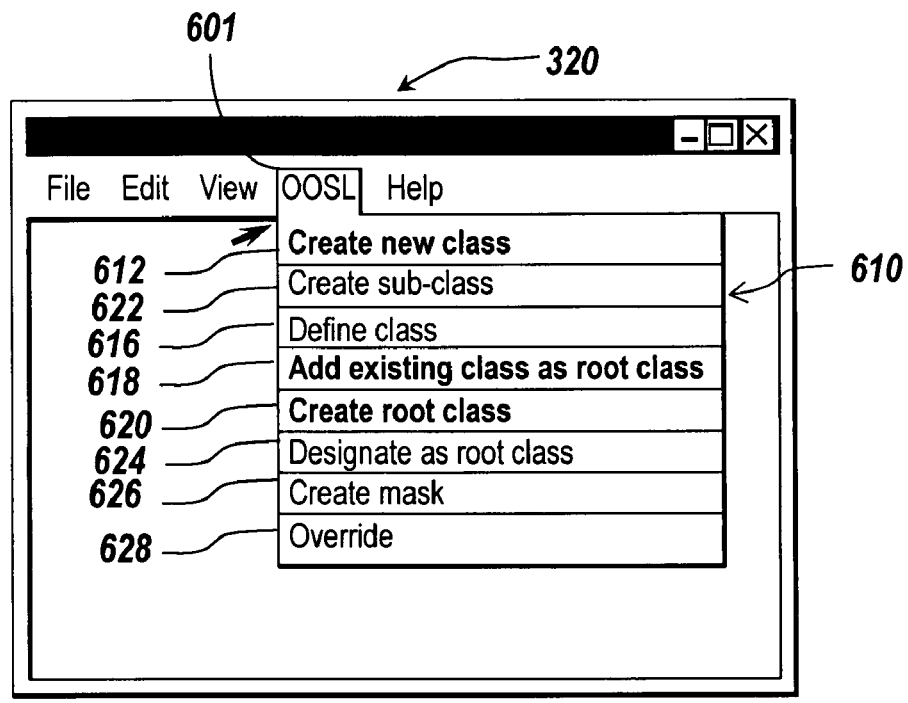
FIGS. 6A-D provide examples a package editor of the graphical modeling environment of FIG. 3.
Figure 6B:
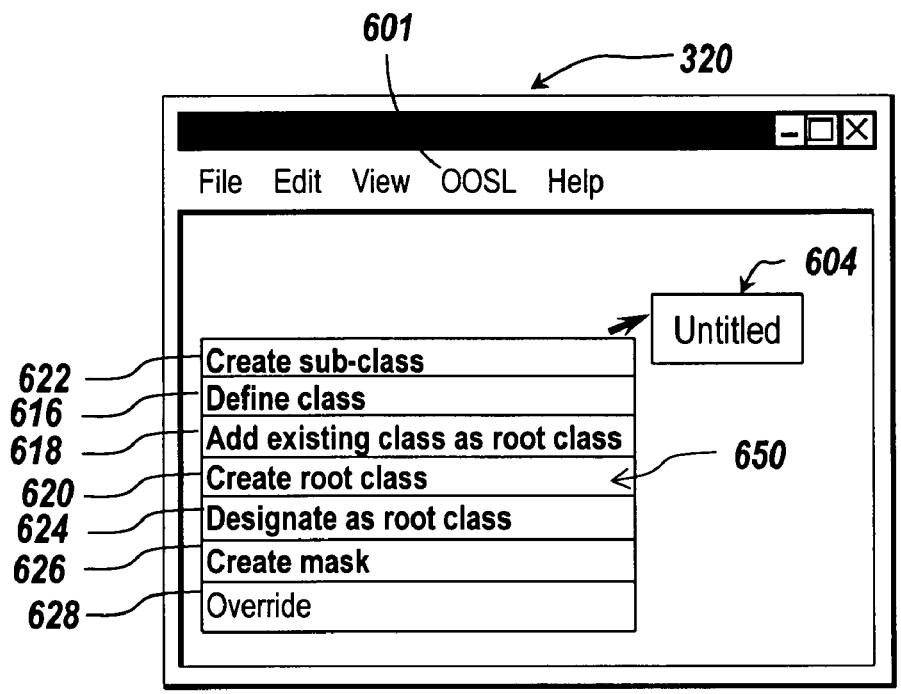

Referring to FIG. 6A, the user can select the 'OOSL' button 601 of the package editor 320. When the 'OOSL' button 601 is selected a menu of options 610 appears. The user can select a 'create root class' option 620 from the menu of options 610. Upon the selection of the 'create root class' option 620, a default symbol 604 appears in the package editor 320 to represent a new class of graphical objects. The default symbol 604 can be renamed by the user. To define the root class of graphical objects, the user can select a 'define class' option 616 from the menu of options 610. Alternatively, the user can right click on the symbol, which causes a menu of options 650 to appear in the package editor 320, as depicted in FIG. 6B. After selecting the 'define class' option 616, the graphical modeling interface 310 appears on the display to allow the user to define the connection interface and optionally the body of the class of graphical objects (step 730).

In another example, to create a root class the user can select the 'create a new class' option 612, thereby creating a new symbol and can specify that the newly created class of graphical objects is a root class. For example, the user may be able to right click on the symbol to bring up the menu of options 650 that includes a 'designate as a root class' option 624. Alternatively, the graphical modeling environment may provide that the first symbol added to the package editor 310 represents a default root class.

The user can graphically edit the symbol using the mask editor 340, as described below and can develop a graphical model in the modeling interface 310 to define the class of graphical objects that is represented by the newly created symbol. The user can define the new class of graphical objects with the modeling interface 310, as described above with respect to FIGS. 4 and 5.

Figure 6C:
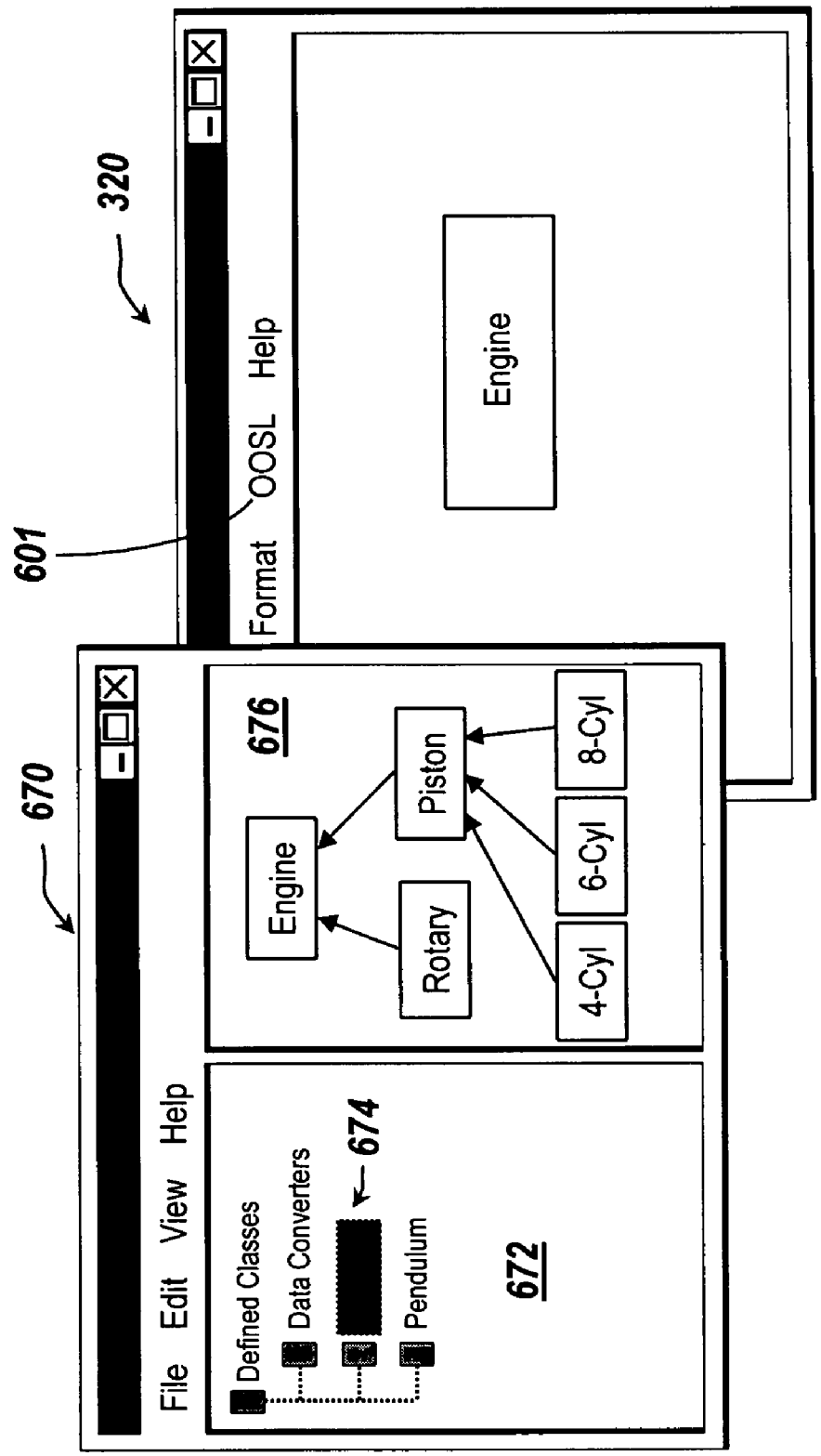

In another example, to create a root class the user can select a class of graphical objects that has already been created from a list of previously created classes of graphical objects. Referring to FIG. 6A, the user can select the 'add existing class as a root class' option 622 in the menu of options 610. Upon the selection of the 'add existing class as a root class' 622, option a class manager 670 appears, as shown in FIG. 6C. The class manager 670 provides a list of hierarchies of user-defined classes 672 that have already been created. The user can select a hierarchy of classes from the class manager 670 to view what classes belong to the hierarchy of classes. For example, the user can select the hierarchy of classes for an engine 674. Upon the selection of the hierarchy of classes for the engine 674, the classes of the hierarchy 676 are displayed in the class manager 670. The user can select a class from the classes and add the class into the package editor 320.

Descendant classes of graphical objects can be created in a similar manner as the root class (step 740). For example, the user can select the root class in the package editor and then can select the 'create a subclass' option 622 from the menu of options 610 or from the menu of options 650. Upon the selection of the 'create a subclass' option 622, a default symbol appears in the package editor 320 that represents the subclass. A line drawn from the subclass to the root class graphically indicates that the root class is the parent of the subclass. The user can then select the 'define class' option 616 from the menu of options 610. The user can also right click on the symbol for the new subclass and select the 'define class' option 616 from the menu of options 650. The user can define the new class of graphical objects with the modeling interface 310, as described above with respect to FIGS. 4 and 5.

By creating a subclass, the user specifies the relationship of the subclass of graphical objects to the classes of graphical objects that have already been added to the package editor (step 750). For example, the user can create a first subclass of graphical objects that is a direct descendant of the root class by selecting the root class and then selecting the 'create subclass' option 622. Upon creating the first subclass or child class to the root class, the modeling interface 310 is automatically filled in with aspects of the root class that are inherited by the first subclass of graphical objects (step 760). Inheritance is discussed in more detail below. Such a first subclass of graphical objects can be referred to as a child class. In this case, the root class can be referred to as a parent class of the first subclass. If the user creates a second subclass of graphical objects that is a direct descendant to the first subclass, then the first subclass can be referred to as a parent class of the second subclass of graphical objects and the second subclass of graphical objects can be referred to as a child class of the first subclass. The second subclass can also be referred to as a descendant of the root class and the root class can also be referred to as an ancestor of the second subclass. In this manner, a user can develop a hierarchy of user-defined classes of graphical objects.

In various embodiments, ports, parameters and signals used in graphical classes can themselves be defined by hierarchies of classes. For example, a parent signal class can have a child class that extends or overrides the signal definition inherited from the parent class. In this manner, a signal can be hierarchically structured and the hierarchy of classes of graphical objects can include, for example, a hierarchy of definitions for signals and parameters. In one example, a parent class may include a bus signal (i.e., a signal that is composed of multiple signals). The various signals associated with the bus signal can be represented in descendant classes of the parent bus signal class.

The user can override an interface and/or body of a class that is in the package editor by selecting the 'Override' option 628, as depicted in FIGS. 6A-B. To use the override option the user selects a class that the user wants to override and then selects the override option. Upon selecting the override option, the graphical modeling interface 310 may be open and display the graphical model that defines the class. Overriding is discussed in more detail below.

Figure 6D:
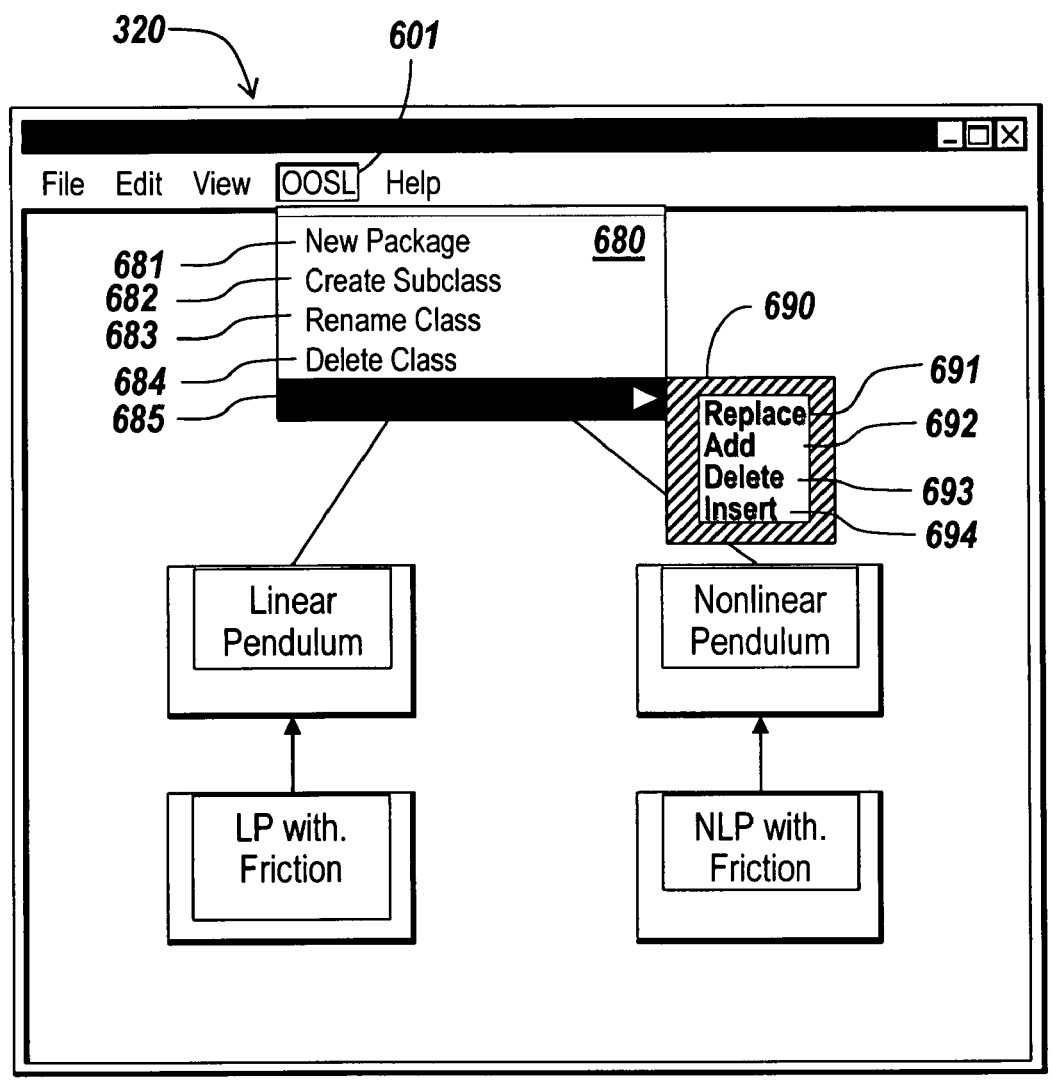

FIG. 6D depicts another example of a menu 680 of options that may be provided when selecting the 'OOSL' button 601 in the package editor 320. The menu 680 can include a "New Package" option 681, a "Create Subclass" option 682, a "Rename Class" option 683, a "Delete Class" option 684 and an "Override" option 685. The "New Package" option 681 allows a user to create a new package to build a hierarchy of graphical objects. The "Create Subclass" option 682 allows a user to create a subclass of a class of graphical objects that is in the package editor. The "Rename Class" option 683 allows a user to change the name of a class in the package editor 320. The "Delete Class" option 684 allows a user to delete a class that is in the package editor 320. The "Override" option 685 allows a user to override a class in the package editor. If the user selects the "Override" option 685 a submenu 690 may appear providing further options for overriding a class. The options in the submenu 690 may include a "Replace" option 691, an "Add" option 692, a "Delete" option 693 and an "Insert" option 694. These options allow a user to manipulate an interface and body of a class that is in the package editor. Overriding a class is discussed in more detail below. The above menus may also be accessible by right-clicking on a symbol of a class in the package editor 320.

A class of graphical objects defined by the graphical model in the modeling interface 310 can have a mask that is automatically generated. The mask is an optional user-defined interface for instances of the class of objects defined by the graphical model. The mask can include a graphical symbol that represents an instance of the class of graphical objects in a graphical model, a dialog box for specifying instance-specific values of parameters defined by the class, and help text. The symbol can have a label that provides a user with an indication of the structure and/or behavior that is represented by the class of graphical objects. The symbol can be any shape such as a square, rectangle, circle, triangle or the symbol can be a graphic such as a picture of what the class of graphical objects can be used to model, such as a picture of an engine. The symbol can be inserted as an element in a graphical model to represent a graphical object of the class of graphical objects.

The mask parameter dialog box allows a user to specify instance-specific values of parameters used in the class body to define the behavior of instances of the class. A descendant class of graphical objects can inherit aspects of a mask from an ancestor. For example, a descendant class of graphical objects can inherit parameters, instance-specific values of parameters, help text, a label that provides a user with an indication of the structure and/or behavior that is represented by the class of graphical objects, etc. A user can display the parameter dialog box for a graphical object by double-clicking the mask symbol that represents the object in the model. For example, the user can double click on the symbol using pointing device. If the user wants to view the body of the class of graphical objects represented by the symbol, an option may be provided such that the user may select the symbol and then select the option from the model editor's menu.

Figure 8:
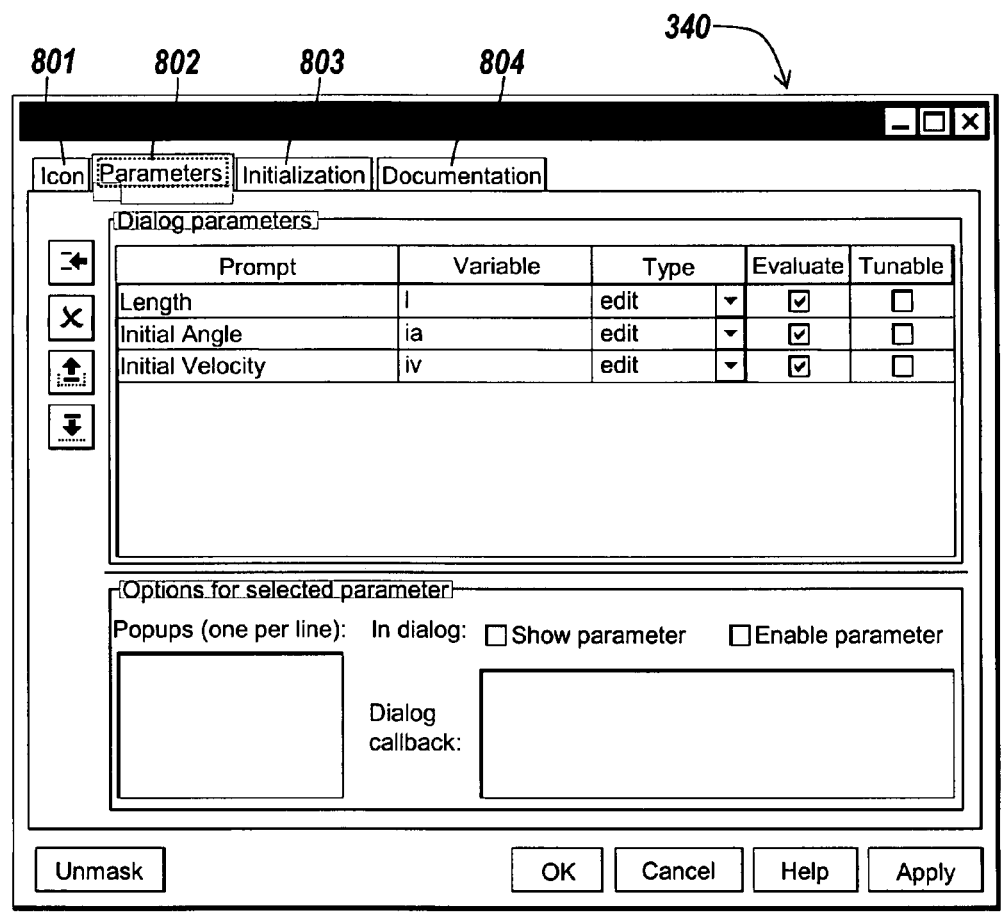
FIG. 8 is an exemplary GUI for the mask editor depicted in FIG. 3.

FIG. 8 is an example of the mask editor 340. The mask editor 340 can include an "icon" tab 801, a "parameters" tab 802, an "initialization" tab 803 and a "documentation" tab 804.

When the "icon" tab 801 is selected, a user can edit, with a symbol editor 344, a symbol that represents an instance of the class of graphical objects. The mask editor 340 allows a user to create and/or edit a symbol with the symbol editor 344. Using the symbol editor 344, the user can change the appearance of the symbol such as the shape, color or name of the symbol.

When the "parameters" tab 802 is selected, a user can edit, with a parameter dialog box designer 342, parameters and values of an instance of the class of graphical objects. The mask editor 340 also provides the parameter dialog box designer 342 that includes, but is not limited to a drag-and-drop interface. The graphical parameter dialog box designer 342 allows a user to define a parameter dialog box for each class of graphical objects. The parameter dialog box designer can provide a palette of dialog box element types that can be dragged into the dialog box. The dialog box elements can include, but are not limited to, an edit field for string parameters, a check box for Boolean parameters, and a popup list for parameters with enumerated values. The mask editor allows the class designer to associate a variable with each dialog box element that can be referenced in the body of the class and hence determine the behavior of instances of the class. The user of an instance of the class of graphical objects can set the variables by entering values in fields or selecting elements on the instance's parameter dialog box. Each instance of the class has a private workspace used to store the values of parameter and simulation variables. This allows the user to specify instance-specific values for parameters and instance-specific variations in behavior.

When the "documentation" tab 804 is selected, a user can add documentation for an instance of the class of graphical objects. For example, the mask editor 340 also allows a user to generate class-specific help for instances of a class of graphical objects that can include, but is not limited to, text that describes the function of the instance, text that describes the data types of the inputs, outputs and parameters of the instance, and text describing the function of each parameter, input and output of the instance.

When the "initialization" tab 803 is selected, a user can optionally add initialization commands for an instance of the class of graphical objects. A user can enter commands that initialize variables that are defined in the class of graphical objects.

Figure 9:
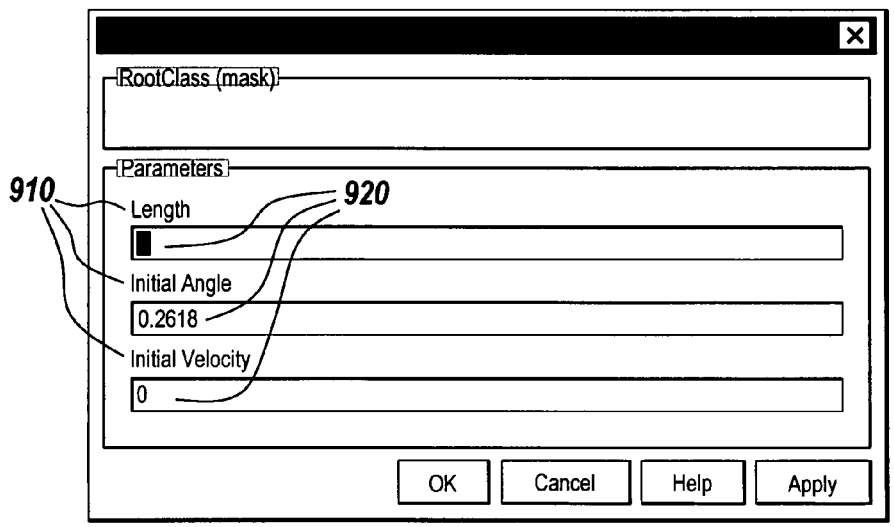
FIG. 9 depicts an exemplary parameter dialog box that can be defined with the parameter dialog box designer of the mask editor.

FIG. 9 depicts an example of a parameter dialog box 900 that can be defined with the parameter dialog box designer 342. The parameter dialog box 900 can include a list of parameters 910 and the values 920 of the each parameter. A user may edit the values for each parameter in the parameter dialog box 900 to change the behavior of an instance of a class of graphical objects.

Each descendant class that is created can inherit all or portions of the aspects directly from a parent class and from ancestor classes via the parent class. For example, a child class can inherit, from a parent class, aspects that the parent class inherited from its parent class. These inherited aspects can then be modified by the child class. An aspect of a class of graphical objects can be, but is not limited to, the graphical model or body that defines the behavior of the ancestor classes, including the model's elements, element properties, element interconnections, ports and port connections, and object parameters. All or portions of the inherited aspects may or may not be modifiable by the descendant classes of graphical objects that inherit the aspects.

In various embodiments, the graphical modeling environment 300 specifies which of the aspects of the ancestor classes are inheritable and which of the inherited aspects can be modified by the class of graphical objects that inherits the aspects. The various embodiments may also allow a user to optionally disallow inheritance or modification of specified aspects on a class by class basis. The feature of inheritance allows a user to specify structure and/or behaviors for descendant classes of graphical objects and allows the descendant classes of graphical objects to reuse the aspects that have been defined for ancestor classes of graphical objects.

Figure 10A:
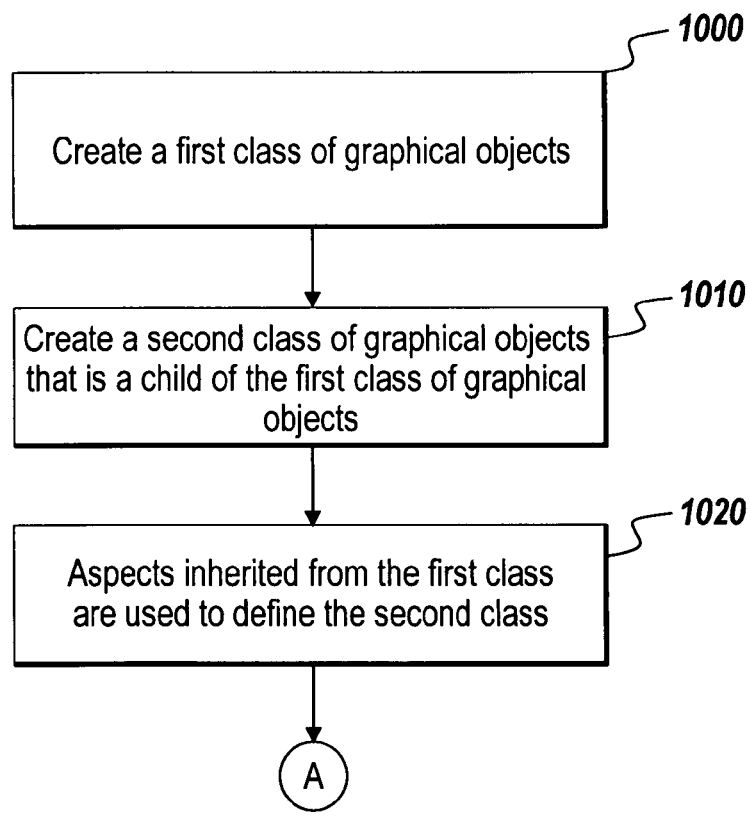
FIGS. 10A-B are a flow diagrams that illustrate exemplary steps providing inheritance in accordance with an embodiment.
Figure 10B:
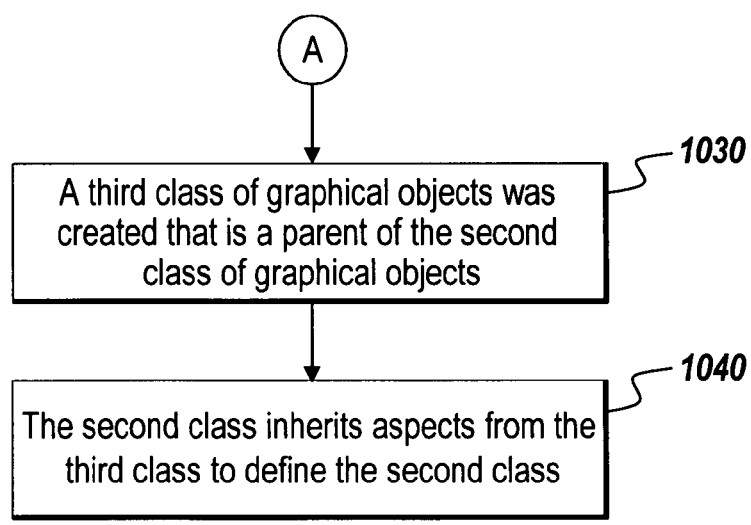

FIGS. 10A-B are flow diagrams of the steps implemented to provide inheritance in accordance with various embodiments. The user can create a first class of graphical objects (step 1000). Subsequently, the user can create a second class of graphical objects, where the second class is a child class of the first class (step 1010). The aspects that are inherited from the parent class automatically appear in the graphical model (e.g., the body and connection interface) that defines the child class (step 1020). Additionally, the user may have created a third class of graphical objects that is also a parent of the second class (step 1030), and the second class may inherit aspects from the third class (step 1040).

In some embodiments that support multiple inheritance, a class hierarchy may have multiple root classes or multiple parent classes for a child class. In one example, various modes of multiple inheritances can be supported including, but not limited to parallel, serial, or mixed parallel-and-serial. Examples of various modes of multiple inheritances are discussed with respect to FIG. 10C, which depicts a graphical representation of a section of a class hierarchy.

Figure 10C:
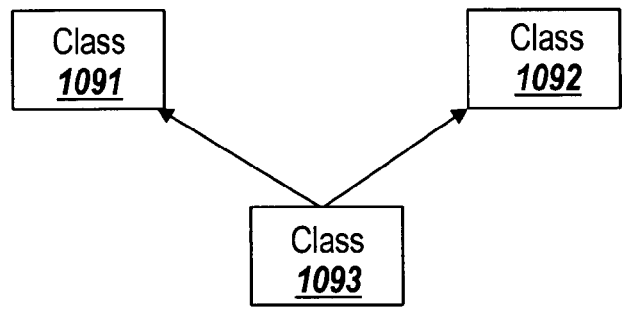
FIG. 10C depicts a section of a class hierarchy for illustrating various modes of multiple inheritances.

In FIG. 10C, a section of a class hierarchy 1090 is depicted that includes a parent class 1091, a parent class 1092 and a child class 1093. The child class 1093 inherits aspects from both the parent classes 1091 and 1092. The aspects inherited from the parent classes 1091 and 1092 depend on the mode of multiple inheritance that is implemented.

In parallel inheritance, for example, the child class 1093 can inherit each of the diagrams of the parents classes 1091 and 1092 such that the number of inputs of the child class 1093 equals the sum of the number of inputs of the parent classes 1092 and 1091, and the number of outputs of the child class 1093 equals the sum of the number of outputs of the parent classes 1091 and 1092. The position of the parent classes 1091 and 1092 in the class hierarchy 1090 determines the order in which the inputs and outputs of the parent classes 1091 and 1092 appear in the child's 1093 interface. For example, the child class 1903 can inherit aspects from the parent class 1091 (left in the inheritance tree) and can inherit aspects from the parent class 1092 (right in the inheritance tree). The parent class 1091 can have, for example, two inputs and one output and the parent class 1092 can have, for example, one input and one output. In this example, the child class 1093 inherits three inputs and two outputs where the first two inputs and first output are inherited from the parent class 1091 and the third input and second output are inherited from the parent class 1092. In effect, parallel inheritance creates the child's diagram by arraying the parent diagrams in a stack.

In contrast to parallel inheritance, for example, serial inheritance can array the parent diagrams side-by-side and connect them to create the child diagram. In particular, in serial inheritance, the parent classes 1091 and 1092 are assumed to have the same number of inputs and outputs and the child class 1093 inherits a diagram that includes the diagrams of the parent classes 1091 and 1092 with the outputs of each parent class connected to the inputs of the next parent in the inheritance tree. The result is that the child has the same number of inputs and outputs as each of its parents, with the child's inputs being the same as the inputs of the leftmost parent and the child's outputs being the same as the outputs of the rightmost parent.

In mixed-mode multiple inheritance, the child class could inherit serially from parents that are adjacent in the inheritance tree and that have the same interface and the child class could inherit in parallel from parents that have interfaces that are different from other parents.

The various embodiments may allow the user to determine the mode of inheritance to use when connecting a child class to its parent and could use differing line styles to indicate that mode by which the child inherits the parent's diagram.

A user can suspend or disable inheritance. The inheritance relations can be disabled or suspended during design of a model of a system to facilitate the configuration of different classes to implement variations of system implementations. The user may, for example, select a particular parent class from a list of parent classes such that only aspects from the selected parent class are inherited. In addition, the inheritance relations can be constrained, for example, to ensure that only one of a set of inheritance relations is active (i.e., not suspended) when the inheriting class is instantiated. In one example, a user may have several implementations of a component of a system that are each defined by a class of graphical objects. When the user develops a model, the user may want to include a particular implementation of the component and may implement that component by specifying that an instantiated class only inherits aspects from a particular class of graphical objects that corresponds to the particular implementation. In another example, the user can instantiate a class that inherits aspects from a parent class that can be used to implement a component of the system and that inherits another class that enables the user to debug various parts of the model. The user may allow multiple inheritance for the purpose of debugging a model developed by the user, but when the user completes the debugging process, the user may disable or suspend the inheritance of aspects from the parent class that enables the user to debug the model.

One skilled in the art will recognize that the above modes of multiple inheritance are merely provided as an examples of modes that can be implemented and are not meant to be limiting and that other modes of multiple inheritance can be implemented.

In some embodiments, design patterns may be used to reduce the time necessary to develop a model. Design patterns allow a user to reuse reoccurring patterns in models or class structures. In this manner, a design pattern can represent a portion of models or class structures that are commonly repeated.

In some embodiments, an algorithmic design pattern in a graphical model can be recognized by the modeling environment 300. The modeling environment 300 may create a class that includes the pattern. The class that includes the pattern can allow subclasses to inherit the pattern. It is typical for graphical models to often include patterns of connected elements. For example, counter functionality may be employed in a number of situations and a corresponding pattern for implementing the counter functionality may appear in the model on multiple occasions. The pattern for implementing the counter functionality may provide that an output of a sum element connects to the input of a memory element and an output of the memory element connects back to an input of the sum element. This pattern can be included in a class to allow inheritance into multiple other classes and can provide a way to conveniently instantiate the counter functionality.

In addition to algorithmic patterns, design patterns can be utilized where a pattern may represent a structure in class relations that addresses a particular problem. Other design patterns can include, for example, creational, structural, behavioral, architectural, concurrency, etc.

Creational design patterns are concerned with class instantiation. For example, abstract factories or prototype cloning may be used to instantiate classes of graphical objects. Abstract factories (i.e., classes) can be used to generate concrete factories (i.e., classes) that have common themes. Prototype cloning can be used to clone an instance of a class in a graphical model to be used in another graphical model or in the same graphical model. By using abstract factories or prototype cloning the graphical modeling environment can implement graphical objects that are suitable for a given situation.

Structural design patterns are concerned with class and object composition. For example, adapters and proxies may be used for interfacing classes of graphical objects. Adapters can be used, for example, to adapt a class interface to allow the class to be implemented in circumstances where the original class interface cannot be used. Proxies can be used to provide a referencing mechanism that allows an instance of a class to reference another class. The proxy may enable remote or local referencing.

Behavioral design patterns relate to communications between objects. For example, a command object may encapsulate an action as well as parameters of the action. Another example of a behavioral design pattern may be publish/subscribe communications.

A publish/subscribe pattern, for example, may consist of a publisher and a subscriber. The subscriber may contain a notify event that can be invoked by the publisher. The subscriber can be registered to the publisher by a method or function call and the notify method of the subscriber can then be called by the publisher. The subscriber may also be unregistered to the publisher by a method or function call.

The function calls, in the above example, may correspond to invoking the functionality of a subsystem, a block, a model, or another model element. For example, a function-call subsystem may be triggered by a function call, which causes the content of the subsystem to be evaluated. This corresponds to a function evaluation with input and output being the input and output to the subsystem. Similarly, a model may be called to evaluate by a function call. The method or function calls may be of a remote nature such as remote procedure calls (RCP) and remote method invocations (RMI).

Architectural design patterns refer to creating classes of graphical objects that implement common architectures. An example of an architectural design pattern that may be implemented is server/client architecture.

Concurrency design patterns can be used to develop classes of graphical objects for implementing threads and/or scheduling operation in a model, where the classes of graphical objects encapsulate policies for execution. An example of a concurrency design pattern may be a scheduler pattern that controls when threads in a single threaded model may execute and may place waiting threads in a sequence for execution.

The above examples of design patterns are provided as possible design patterns that may be implemented and are not meant to be limiting. One skilled in the art would recognize that other design patterns may be implemented in accordance with the illustrative embodiment.

The structure and behavior of each descendant class of graphical objects can extend beyond the aspects that are inherited from the ancestor classes of graphical objects. A child class of graphical objects can, for example, add additional elements to the body inherited from at least one parent class or can modify modifiable inherited aspects. The child class can add object parameters to those inherited from the parent class in order to provide additional instance-specific structure and/or behavior.

Extensions to the ancestor classes of graphical objects can include, but are not limited to, element replacement, element addition, element insertion, element deletion, or refinement of properties of an element. Element replacement allows any element in the parent diagram that is replaceable to be replaced by another element. For example, an element that represents a continuous integrator can be replaced by an element that represents a discrete integrator. Element addition refers to adding new elements and connections to the body of the parent class of graphical objects. Element deletion refers to removing an element from between two elements or from before or after an element. Element insertion refers to the insertion of an element between existing elements that were directly connected. Refining of element properties refers to changing a property that is associated with the element such as changing the gain of an element that represents a gain block that has been inherited from the parent class.

Using element replacement, a user can replace any element in the graphical model that is inherited from an ancestor class. For example, a user can replace an element with a user-defined element or any element that allows the user to define the functional relationships between connections to override an element of the parent class or to override custom behavior defined by the parent class. The user can replace a predefined element of the parent class with another predefined element that has the same port interface. To replace an element the user can simply use a drag-and-drop operation, where the user graphically drags an element from an element library and drops it on the element to be replaced. Alternatively, the graphical modeling environment 300 can provide a replace option such that the user can select the element that the user wants to replace and then select the replace option which can cause a navigable display of elements and element libraries to be displayed.

The user can implement a subsystem to override the behavior, but not the interface, of any element inherited from a parent class. To use a subsystem to override the behavior of an element, the user can, for example, select the element and then select an 'override by subsystem' option from a menu in the modeling interface 310. The element is then replaced by a subsystem. The user can select the subsystem by double clicking on the subsystem, which opens the subsystem for editing or the subsystem can automatically be opened for editing by the modeling interface. The subsystem that is created includes port blocks.

Port blocks can have representations on the element symbol and can be positioned automatically by the graphical modeling environment 300. An output can be represented by multiple port blocks in the interface. Port blocks can be assigned data types. Further, port blocks can read types of data conveyed from external files such as structs in C include files. Port blocks can have assigned sample times and can use their names to automatically label lines connected to them. Port blocks can be used to select a subset of signals to be passed on to the content of the subsystem and can have latching semantics to lock and preserve an input value during a model evaluation. Port blocks can convey complex values (i.e., with a real and imaginary part) and can convey frames (i.e., a set of samples that have been gathered over a number of points in time). Ports blocks can specify what type of interaction they require, such as, but not limited to temporal behavior or event sequences, and can validate whether the actual connection matches the required type of interaction. Ports can have requirements associated with them that are stored in a database, text document, spreadsheet, and the like, and that can be hot-linked in the model.

The ports of the subsystem can be automatically configured to match the ports of the element replaced by the subsystem. The graphical model of the subsystem can be a replica of the element that has been replaced or there may be no graphical model provided such that the user has to create a graphical model to replace the overridden element. If a replica of the element is provided in the subsystem, the user can delete or edit any portion of the graphical model and can provide a new implementation. In some embodiments, the new implementation provides the internal connections for all the port blocks defined by the overridden elements.

When a user replaces an element inherited an ancestor class, the graphical modeling environment 300 replaces the element of the ancestor class in the descendant class with the element used to override the element of the ancestor class. In one example, for all element replacements, the modeling tool 100 preserves the connections to the replaced element. The user can use the replacement element to redefine the behavior of the overridden element, but must honor the connections of the overridden element. In this manner, a replacement element can support additional connections, but it cannot support fewer connections nor can the user reconfigure existing connections to the replacement element.

Figure 11:
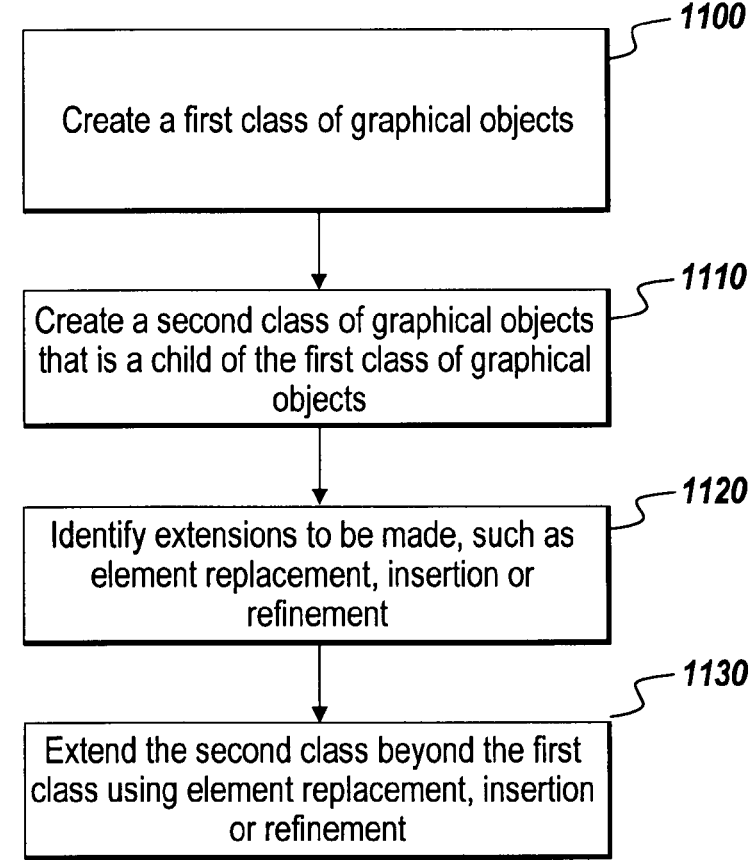
FIG. 11 is a flow diagram that illustrates exemplary steps for extending a parent class of graphical objects with a child class of graphical objects.

FIG. 11 is a flow diagram that illustrates the steps taken to extend a parent class. The user can create a first class of graphical objects (step 1100). Subsequently the user can create a second class of graphical objects, where the second class is a child class of the first class that inherits aspects of the first class (step 1110). The user identifies the extensions of the first class of graphical objects that the user desires to have in the second class of graphical objects, such as adding, inserting, replacing, deleting, or refining elements (step 1120). For example, the user may identify an element in the second class that the user wants to add or insert into the graphical model inherited from the first class or the user may identify an element inherited from the first class that the user wants to replace in the second class. The user extends the second class of graphical objects beyond the inherited aspects of the first class of graphical objects by adding, inserting, replacing or refining elements (step 1130).

The graphical modeling environment 300 allows a user to add connections to the connection interface of the root class at anytime. The modeling environment can prevent a user from removing connections from the root class that are relied on by the descendant classes of graphical objects. Each descendant class of graphical objects may be restricted from changing the number and base types of connections in the connection interface inherited from an ancestor class. However, a descendant class may replace a connection inherited from an ancestor class with a subtype of the inherited connection. This restriction allows efficient implementation of polymorphism by avoiding the need to reconnect objects when instances of children of the same class replace each other during simulation of the model.

A class of graphical objects in the hierarchy of classes of graphical objects can be fully specified or it can be partially specified. If a class of graphical objects is fully specified, the first class of graphical objects can be instantiated in a graphical model of a dynamic system and can be simulated. If, however, the class of graphical objects is only partially specified, the class of graphical objects cannot be independently instantiated in a graphical model of a dynamic system and is not capable of being simulated. For example, a user can define the connection interface of the class of graphical objects completely, but may not specify any or only a portion of the body of the class such that the body does not include certain elements or element properties necessary to make the class of graphical objects fully specified. A class of graphical objects that is fully defined is a concrete class of graphical objects. A class of graphical objects that is not fully defined is an abstract class of graphical objects.

In the case where an ancestor class of graphical objects in the hierarchy of classes of graphical objects is not fully specified such that the ancestor class is an abstract class, a descendant class can provide aspects that are necessary to fully define the ancestor class.

Figure 12:
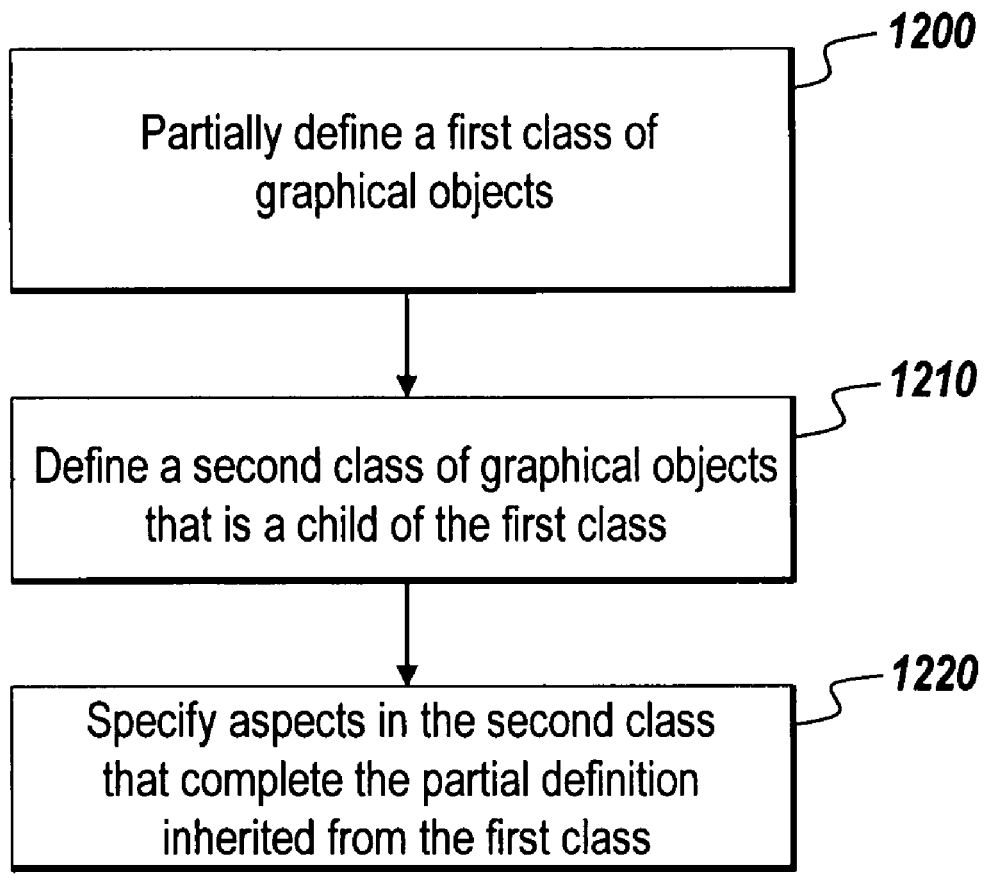
FIG. 12 is a flow diagram that illustrates exemplary steps for creating an abstract class in accordance with an embodiment.

FIG. 12 is a flow diagram that illustrates the steps of creating an abstract class. The user can partially define a first class of graphical objects (step 1200) such that the first class of graphical objects cannot be instantiated independently in an executable graphical model of a dynamic system. The user defines a second class of graphical objects as a child class of the first class of graphical objects (step 1210). The user specifies aspects in the second class of graphical objects that can be used to fully define the first class of graphical objects (step 1220). Alternatively, the second class may specify certain aspects for defining the first class, but may not fully define the first class. In this case, the user may define a third class of graphical objects that is a descendant of the first and second classes of graphical objects. The third class can fully define the first and second classes of graphical objects.

Figure 13A:
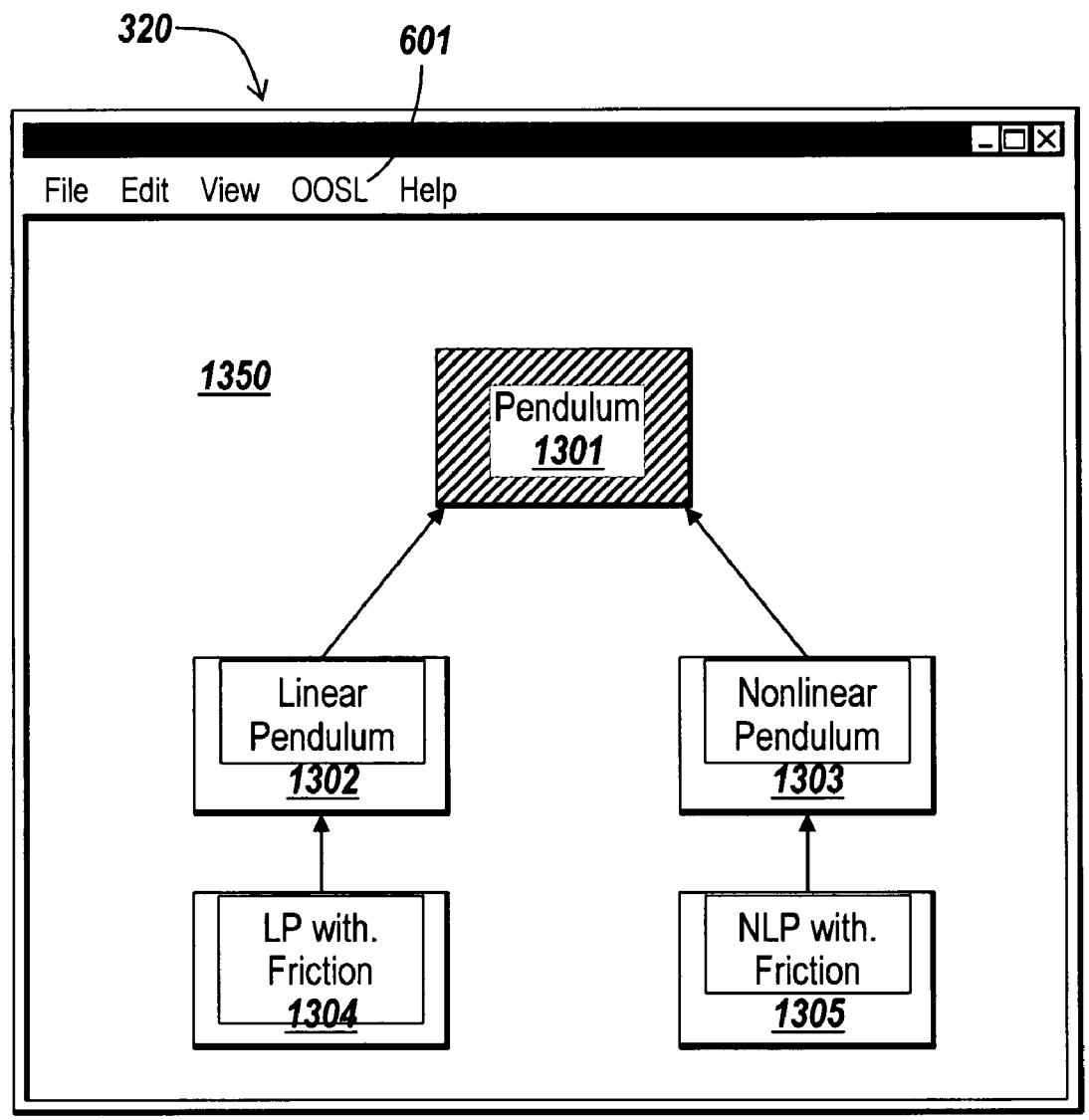
FIG. 13A is an exemplary package that has been generated in a package editor.

FIG. 13A is an example of a package 1350 that has been generated in the package editor 320. The package 1350 is a hierarchy of classes of graphical objects that is represented by a first symbol 1301, a second symbol 1302, a third symbol 1303, a fourth symbol 1304 and a fifth symbol 1305. The first symbol 1301 represents a first class of graphical objects. The second symbol 1302 represents a second class of graphical objects. The third symbol 1303 represents a third class of graphical objects. The fourth symbol 1304 represents a fourth class of graphical objects. The fifth symbol 1305 represents a fifth class of graphical objects. The symbols 1301-1305 are arranged graphically in a hierarchy that represents a hierarchy of the classes of graphical objects. The user adds each symbol 1301-1305 to the package editor 320 to form a package and designates the relationships among the symbols. For example, the user can create a root class and then create a subclass that is a child class of the root class. Upon creating the child class, an arrow is drawn from the child class to the root class to indicate the relationship between the two classes.

The first class of graphical objects represented by the first symbol 1301 is the root class, in that, the first symbol 1301 has no ancestors and is at the top of the hierarchy. The symbols 1302-1305 represent classes of graphical objects that are descendants of the first class of graphical objects. The second and third symbols 1302 and 1303 represent children classes of graphical objects of the first class of graphical objects represented by the first symbol 1301. The first symbol 1301, therefore, represents a parent class of the second and third classes of graphical objects represented by the second and third symbols 1302 and 1303. The fourth symbol 1304 represent a child class of the second symbol 1302 such that the second class of graphical objects represented by the second symbol 1302 represents a parent class of the fourth class of graphical objects represented by the fourth symbol 1304. The fifth symbol 1305 represents a child class of the third symbol 1303 such that the third class of graphical objects represented by the third symbol 1303 represents a parent class of the fifth class of graphical objects represented by the fifth symbol 1305.

The second and third classes of graphical objects represented by the second and third symbols 1302 and 1303 can inherit all or a part of the aspects from the first class of graphical objects represented by the first symbol 1301. For example, the second class of graphical objects may only inherit the connection interface of the first class of graphical objects. All or portions of the inherited aspects from the first class of graphical objects may or may not be modified by the class of graphical objects that are descendants of the first class graphical objects. For example, the second class of graphical objects may inherit the connection interface and body of the first class of graphical objects and then may be able to modify the body but not the connection interface.

The fourth and fifth classes of graphical objects can inherit aspects from the second and third classes of graphical objects, respectively. The fourth and fifth class of graphical objects can also inherit, respectively, those aspects inherited by the second and third class of objects from the first class of graphical objects. The aspects inherited by the fourth and fifth classes of graphical objects may or may not be modified.

A user may specify whether aspects inherited from ancestor classes of graphical objects can be modified. For example, the package editor can have an option such that the user can specify the portions of the class of graphical objects that can be modified and that cannot be modified. The graphical modeling environment 300 may also apply rules for specifying whether inherited aspects are modifiable. For example, the modeling environment can implement a rule that prohibits modification of the aspect related to the number of connections on the connection interface.

The package 1350 can represent classes of graphical objects corresponding to models for pendulums. The first symbol 1301, for example, can represent a class of graphical objects that provide basic graphical models of a pendulum. The first symbol 1301 is shaded to indicate that it represents an abstract class of graphical objects. The class represented by the symbol 1301, therefore, is not fully defined. While a symbol that represents an abstract class of graphical objects is indicated by a shaded symbol, one skilled in the art would recognize that an abstract class of graphical objects can be indicated by any indicator such as, for example, a symbol shaded in any color, a border of any color and/or an annotation.

The second symbol 1302 can represent a class of graphical objects that provides the pendulum's properties when the pendulum is operating in a linear region. The fourth symbol 1304 can represent a class of graphical objects that provides the pendulum's properties when the pendulum is operating in the linear region with friction.

The third symbol 1303 can represent a class of graphical objects that provides the pendulum's properties when the pendulum is operating in a nonlinear region. The fifth symbol 1305 can represent a class of graphical objects that provides the pendulum's properties when the pendulum is operating in the nonlinear region with friction.

While the symbols are represented by rectangles, one skilled in the art would recognize that the symbols can be any shape such as a circle, square, oval, or polygon, or the symbol can be a graphic such as a graphic of a pendulum or of any other form. Annotations can be used to indicate equations that are implemented by the objects represented by the symbol and/or can be used to provide a brief description of the class of graphical objects represented by the symbol.

Figure 13B:
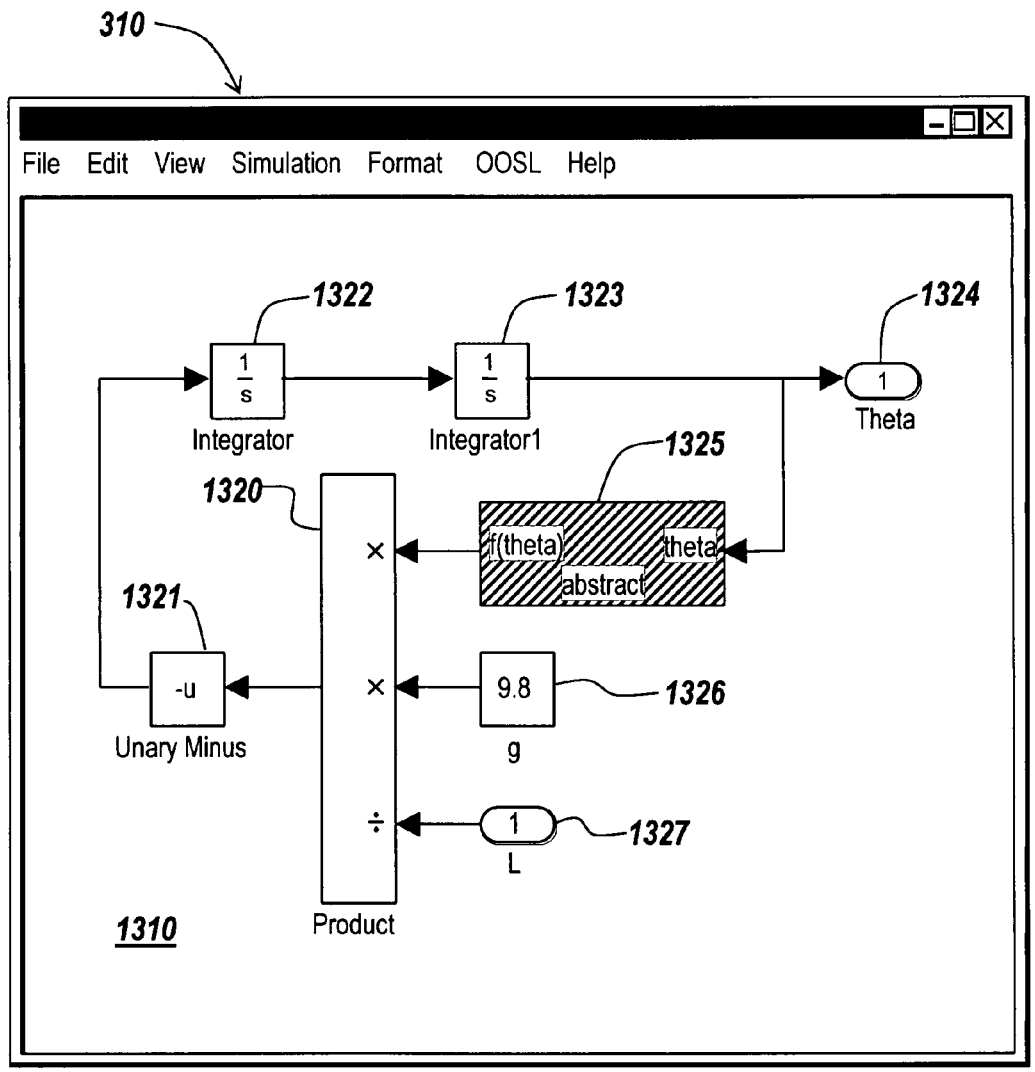
FIG. 13B depicts an exemplary a block diagram that defines the general behavior of pendulums, where the block diagram serves as part of the definition of an abstract pendulum class.

FIG. 13B depicts the modeling interface 310 and the contents of the class of graphical objects represented by the first symbol 1301. The contents can be represented by a relationship diagram, which in this case is a block diagram 1310 that constitutes the body and connection interface and hence defines the behavior and connectivity of the class of objects represented by the first symbol 1301. The user can view the block diagram by selecting and double-clicking the first symbol 1301. Upon double-clicking the first symbol 1301, the modeling interface 310 appears and displays the block diagram 1310 that defines the behavior of the class of graphical objects represented by the symbol 1301. The block diagram 1310 defines the basic behavior of a pendulum. The block diagram 1310 includes elements 1320-1327. The element 1325 is shaded to indicate that the element 1325 is the portion of the block diagram 1310 that is not fully specified. Since the class of graphical objects, whose behavior is defined by the block diagram 1310, is abstract, the class of graphical objects defined by block diagram 1310 cannot be independently instantiated or simulated in a graphical model. The descendant classes of graphical objects in the hierarchy of classes of graphical objects represented by the symbols in the package 1350 can define the element 1325 to make the class of graphical objects 1310 concrete.

Figure 13C:
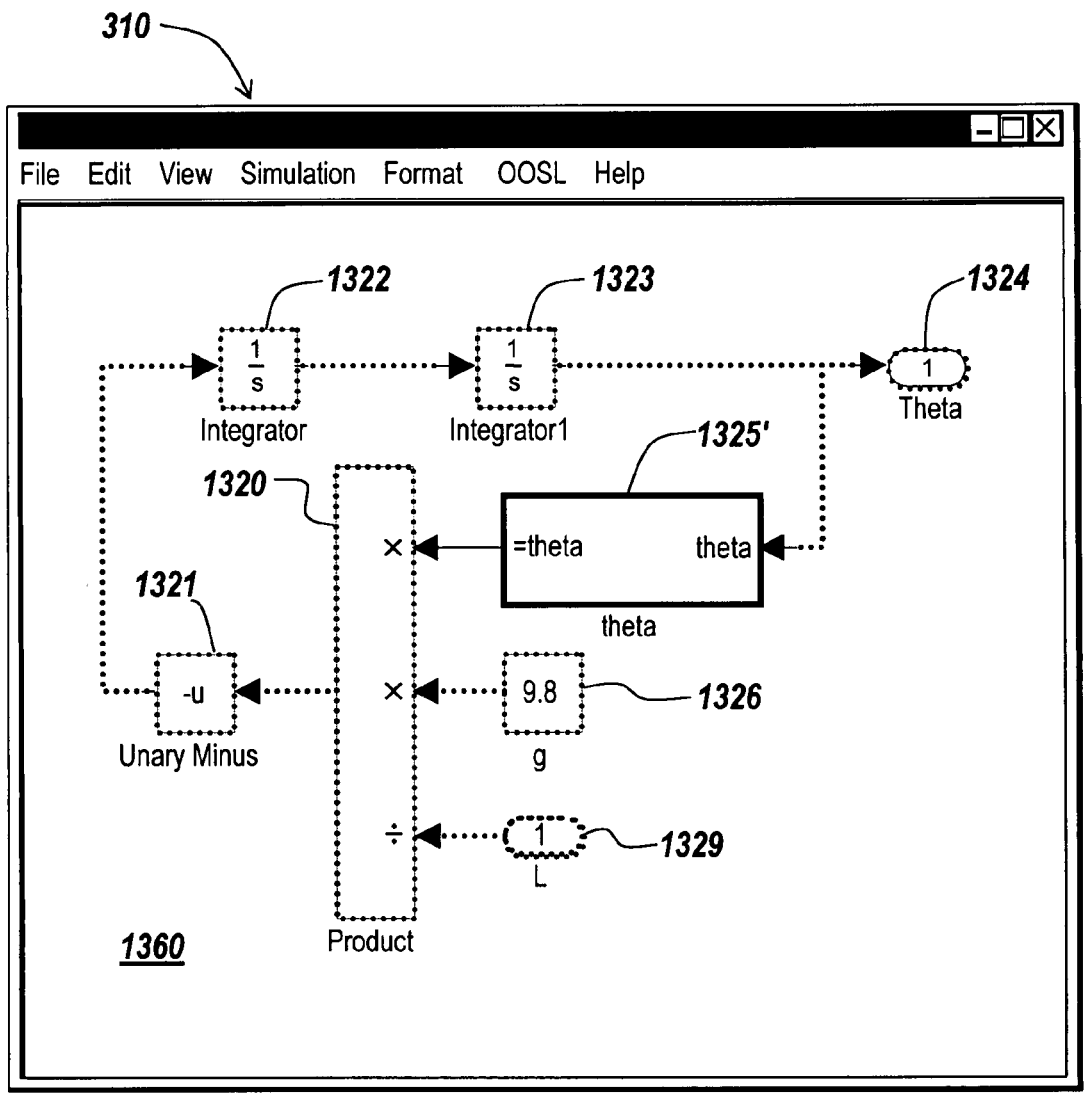
FIG. 13C depicts a block diagram inherited from the class of graphical objects depicted in FIG. 11B that is modified to define the behavior of a descendant class of linear pendulums.

FIG. 13C depicts the modeling interface 310 and the contents of the class of graphical objects represented by the second symbol 1302. The contents can be represented by a relationship diagram, which in this case is a block diagram 1360 that defines the behavior of the class of graphical objects represented by the second symbol 1302. The user can select the second symbol 1302 to display the block diagram 1360 of the linear pendulum class of graphical objects in the modeling interface 310. The portions of the block diagram 1360 that are depicted with dashed lines indicate portions of the block diagram 1310 that were inherited from the class of graphical objects 1301.

One skilled in the art will recognize that the depiction of inheritance with dashed lines is merely an example of one implementation of graphically depicting inherited aspects in a class of graphical objects and that other implementations can be used. For example, inherited aspects may be shaded, annotated, given a different color, etc., or may be identified in any other manner.

Referring again to FIG. 13C, the element 1325' in the model 1360 has replaced the abstract element 1325 of the model 1310, thereby, making the class of graphical objects defined by block diagram 1360 concrete. The feature of inheritance allows the user to develop variations of classes of graphical objects without having to recreate graphical models for each implementation of the variations of the object to be modeled.

In various embodiments, the user can create an instance of a class in a model by dragging or copying the class symbol from the package editor to the model editor. If the class is a concrete class, the instantiation operation replaces the class symbol with an instance symbol that has the same mask and diagram as the class symbol. For example, a user can develop a graphical model by placing the second symbol 1302 in the modeling interface 310. The graphical model developed by placing the second symbol 1302 in the modeling interface 310 is a graphical model of a pendulum that operates in the linear region.

A user can use the modeling interface to insert a symbol representing an instance of a class of graphical objects in a graphical model and can subsequently simulate the graphical model and/or generate code from the model. To do this the user can select a symbol from the package editor and add it to the graphical model as an element. Elements in the graphical model can connect to the symbol based on the connection interface of the class of graphical objects. In this manner, the classes of graphical objects in the hierarchy of classes of graphical objects can be instantiated and simulated and/or can be used to generate, for example, code and a report from the model in the graphical modeling environment 300. Further, a graphical model that includes an instance of a class of graphical objects can be used to generate a report or generate a code structure that can be serialized and exported in XML format and that can be used to indicate analysis results.

Various embodiments of the present invention also provide the feature of polymorphism in a graphical modeling environment. Polymorphism allows classes of graphical objects that have the same connection interface to be used interchangeably during a simulation of a graphical model that includes instances of classes of graphical objects. In particular, in various embodiments, a user can instantiate an abstract class by dragging or copying an instance of the abstract class's symbol from the class hierarchy displayed in the package editor into the model displayed in the model editor. The instantiation operation replaces the abstract class symbol with an instance symbol that has the same mask as the abstract class but has a diagram that instantiates each of the abstract class's concrete subclass as conditionally executed diagrams together with graphical switching and state handoff logic that enables execution of the concrete instances depending on runtime conditions defined by the concrete subclasses.

Figure 14:
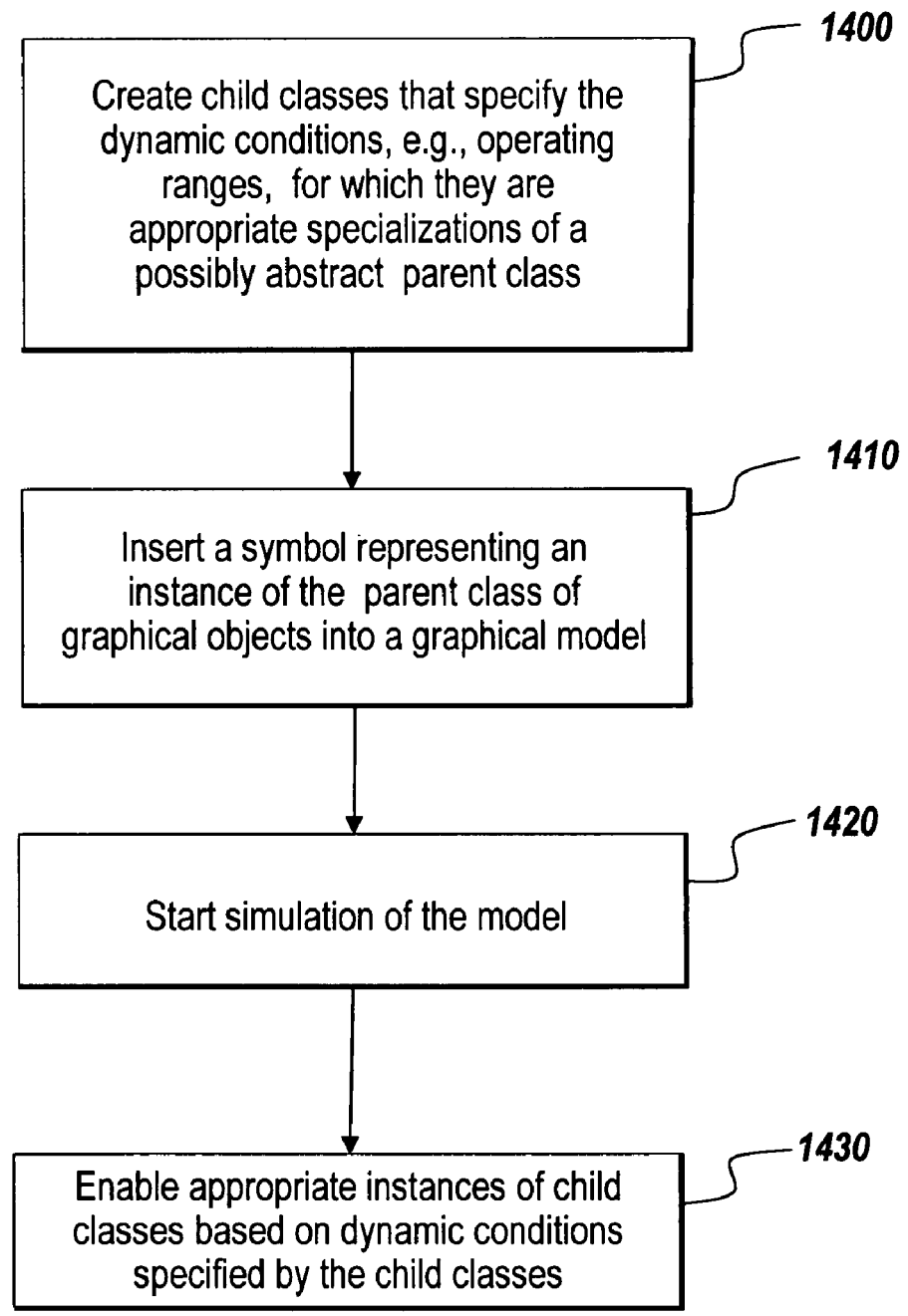
FIG. 14 is a flow diagram that illustrates exemplary steps for polymorphism in accordance with an embodiment of the present invention.

FIG. 14 is a flow diagram that illustrates the feature of polymorphism. For example, the user can create a hierarchy of pendulum classes of graphical objects that includes parent classes and children classes. The children classes specify dynamic conditions, such as, for example, operating ranges, for which the children class are appropriate specializations of a parent class (step 1400). The user can drag the first symbol 1301 representing an abstract pendulum from the class diagram displayed in the package editor window 320 into a graphical model (step 1410) displayed in the model interface 310. Since the first symbol 1301 represents an abstract class of graphical objects, the graphical modeling environment 300 can use the feature of polymorphism to instantiate the first symbol 1301.

In particular, the graphical modeling environment 300 can create a pendulum instance diagram comprising a conditionally executed nonlinear pendulum diagram and a conditionally executed linear pendulum diagram together with switching and state handoff logic that enables execution of the concrete instances depending on runtime conditions defined by the concrete subclasses.

Figure 15:
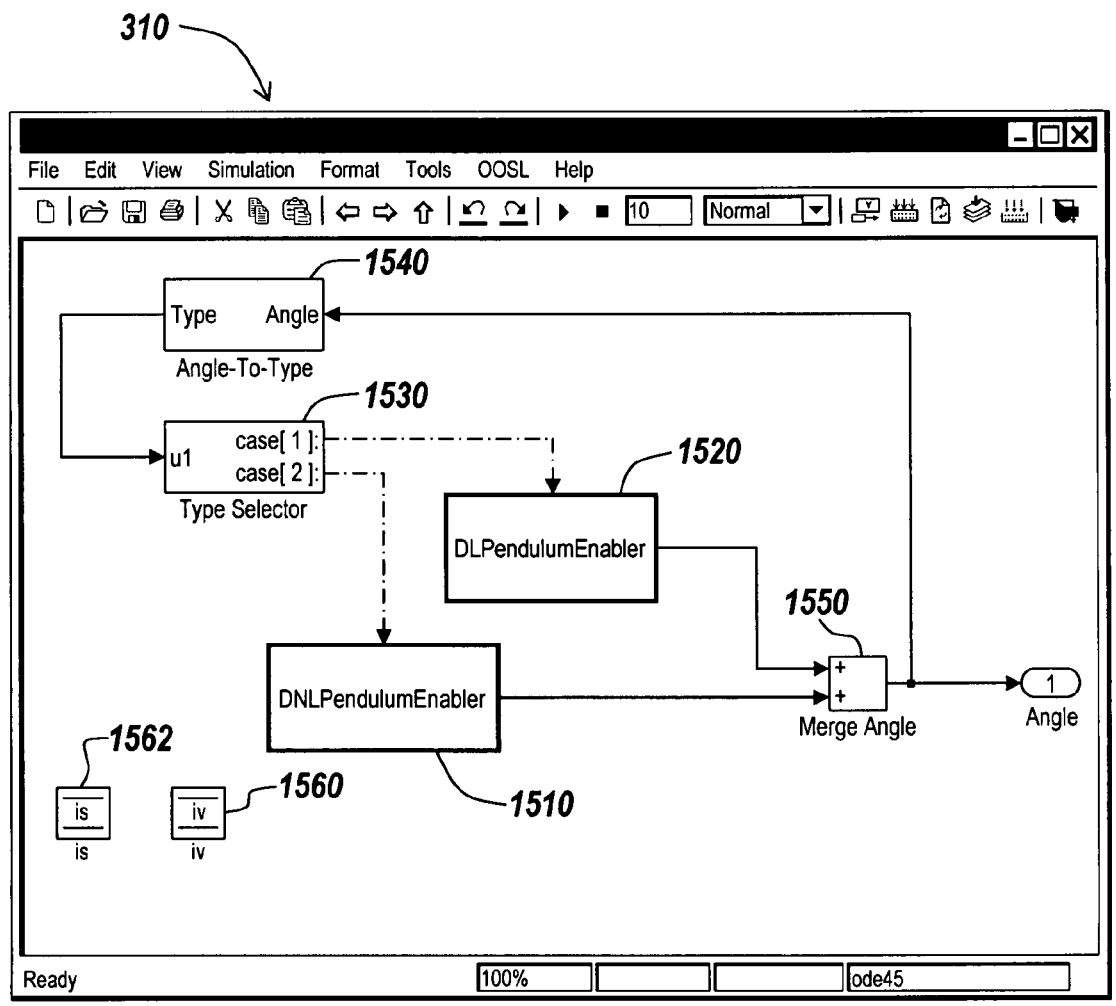
FIG. 15 is an exemplary graphical model for a polymorphic instance that is produced when an a symbol representing an abstract class is inserted into the model.

FIG. 15 is an example of a pendulum instance diagram 1500 that is produced when the pendulum class represented by symbol 1301 is inserted into the modeling interface 310. The instantiation operation embeds the diagrams of the damped non-linear pendulum and damped linear pendulum subclasses in conditionally executed subsystems, such as function-call subsystems 1510 and 1520, respectively. Function-call subsystems are executed when they are called. A Sum block 1550 merges the output of the two subsystems 1510 and 1520, which are enabled in mutually exclusive regions of the pendulums operating range by switching logic added by the instantiation operation. An angle-to-type block 1540 converts the angular output of the pendulum instance to an integer indicating one of the two subtypes based on the value of the angle and the output range defined for each instance. The output of the angle-to-type converter 1540 is fed to a case block 1530 that selects the appropriate subclass instance to execute based on the current value of the pendulum angle. For example, if the case block 1530 receives a "1" from the angle-to-type converter 1540, the instance of the linear pendulum class is executed. If, however, the case block 1530 receives a "2" from the angle-to-type block 1540, the instance of the nonlinear pendulum class is executed. The blocks 1560 and 1562 that are labeled "iv" and "ia" are memory blocks. The memory block 1560 and 1562 are used to store the current value of the pendulum's angle and velocity. State handoff logic uses the memory block 1560 and 1562 to initialize a subclass instance when it becomes active.

Figure 16:
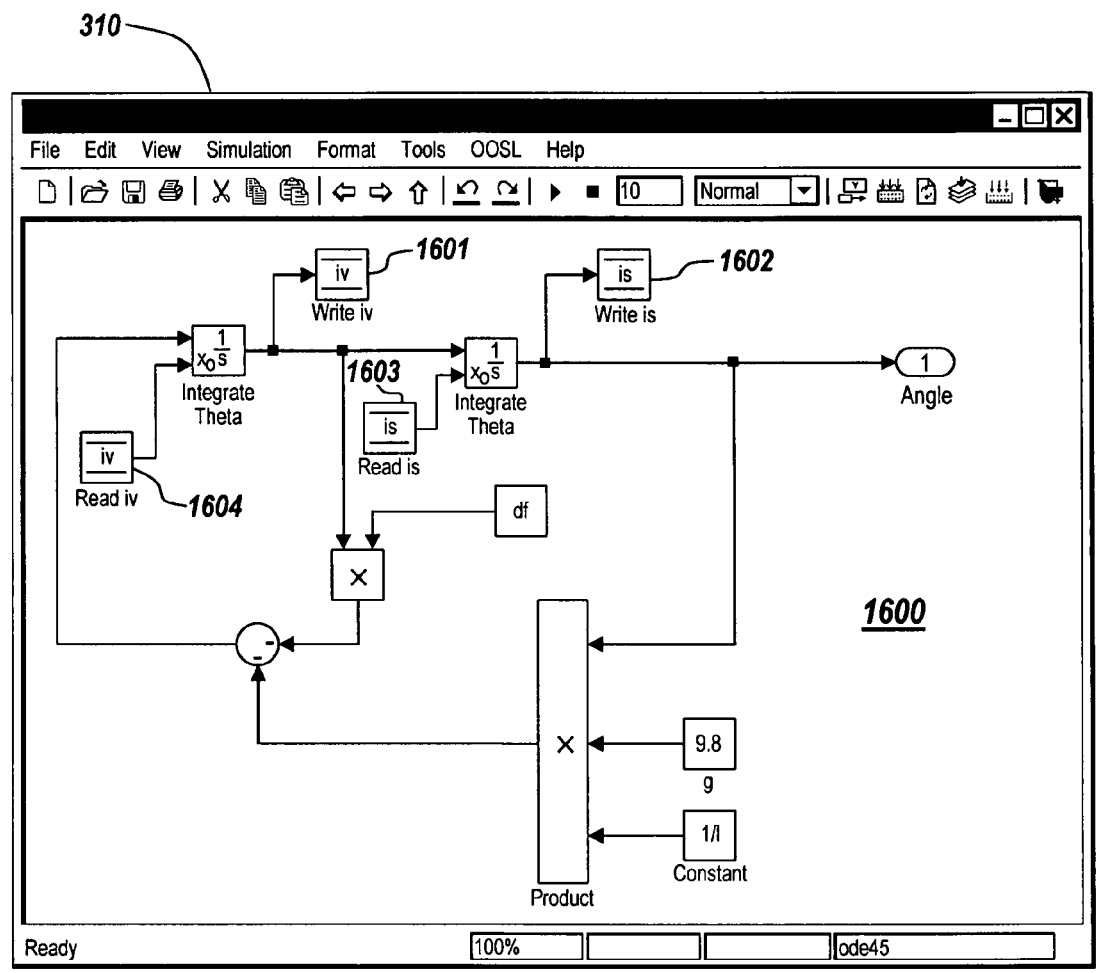
FIG. 16 is an exemplary graphical model that represents an instantiated subclass that is embedded in a conditionally executed subsystem of FIG. 15.

FIG. 16 is an example of a diagram 1600 that represents the instantiated damped linear pendulum subclass that is embedded in the conditionally executed subsystem 1520. The instantiation operation adds blocks to the instance diagram 1600 of the linear pendulum to affect state handoff. The instantiation operation adds a memory write block 1601, a memory write block 1602, a memory read block 1603 and a memory read block 1604 for each integrator block in the diagram 1600. At each time step in which the damped linear pendulum instance is active, memory write block 1601 stores the output of the angle acceleration integrator in the velocity memory block 1560. Similarly, memory write block 1602 stores the output of the velocity integrator in the angle memory block 1562. Whenever the pendulum angle enters the linear operating range, the polymorphic switching logic enables the damped linear pendulum. At the first time step in which the linear instance becomes enabled, the instance's angle acceleration integrator reads its initial condition from velocity memory block 1560, using memory read block 1604. At this time step, velocity memory block 1560 contains the velocity of the pendulum at the previous time step when the damped nonlinear pendulum was enabled. In this way, the polymorphic switching logic hands the pendulum's velocity state off from the nonlinear pendulum instance to the linear pendulum instance and vice versa. Similarly, whenever the linear instance becomes enabled, the instance's velocity integrator reads its initial angle from the angle memory block 1562 where it was stored by the previously active nonlinear instance.

Figure 17:
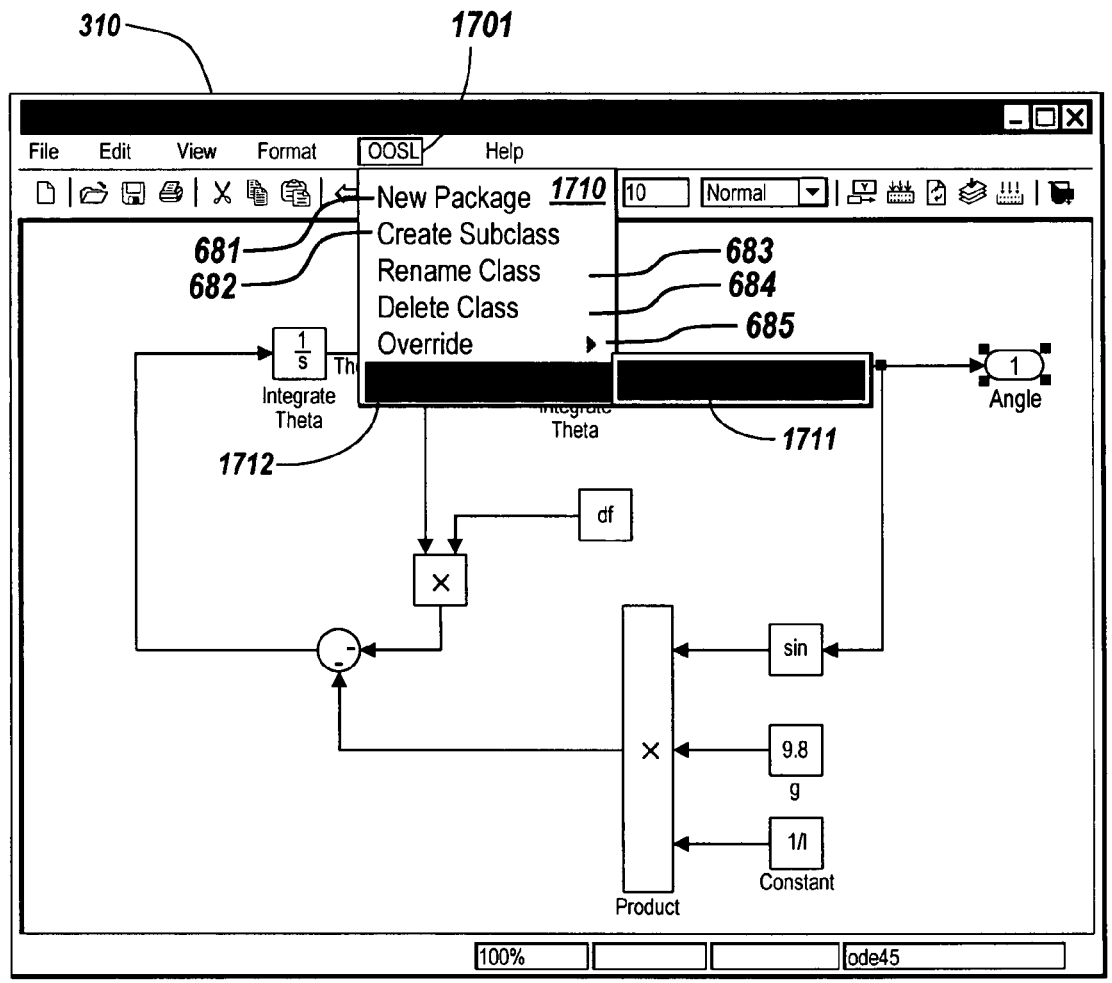
FIG. 17 is an exemplary menu that allows the user to select an option for specifying an output range for dynamically switching between instances of subclasses of an abstract parent class in a polymorphic instantiation of the parent class.

FIG. 17 is an example of a menu 1710 that can be provided to the user to allow the user to specify an output range for dynamically switching between instances of classes of graphical objects. The modeling interface 310 can have a menu button "OOSL" 1701. When the "OOSL" button 1701 is selected the menu 1710 may be provided to the user. The menu 1710 can include the "New Package" option 681, the "Create Subclass" option 682, the "Rename Class" option 683, the "Delete Class" option 684 and the "Override" option 685, as discussed with respect to FIG. 6D. The menu 1710 can also include an "Enable Instance" option 1711. This option is enabled only when an output port is selected in the model editor window. When the "Enable Instance" option 1711 is selected, a submenu can be provided that allows the user to chose an "Output Range" option 1712. When the "Output Range" option 1712 is selected a user interface may be provided to the user to allow the user to specify an output range for the selected output port.

Figure 18:
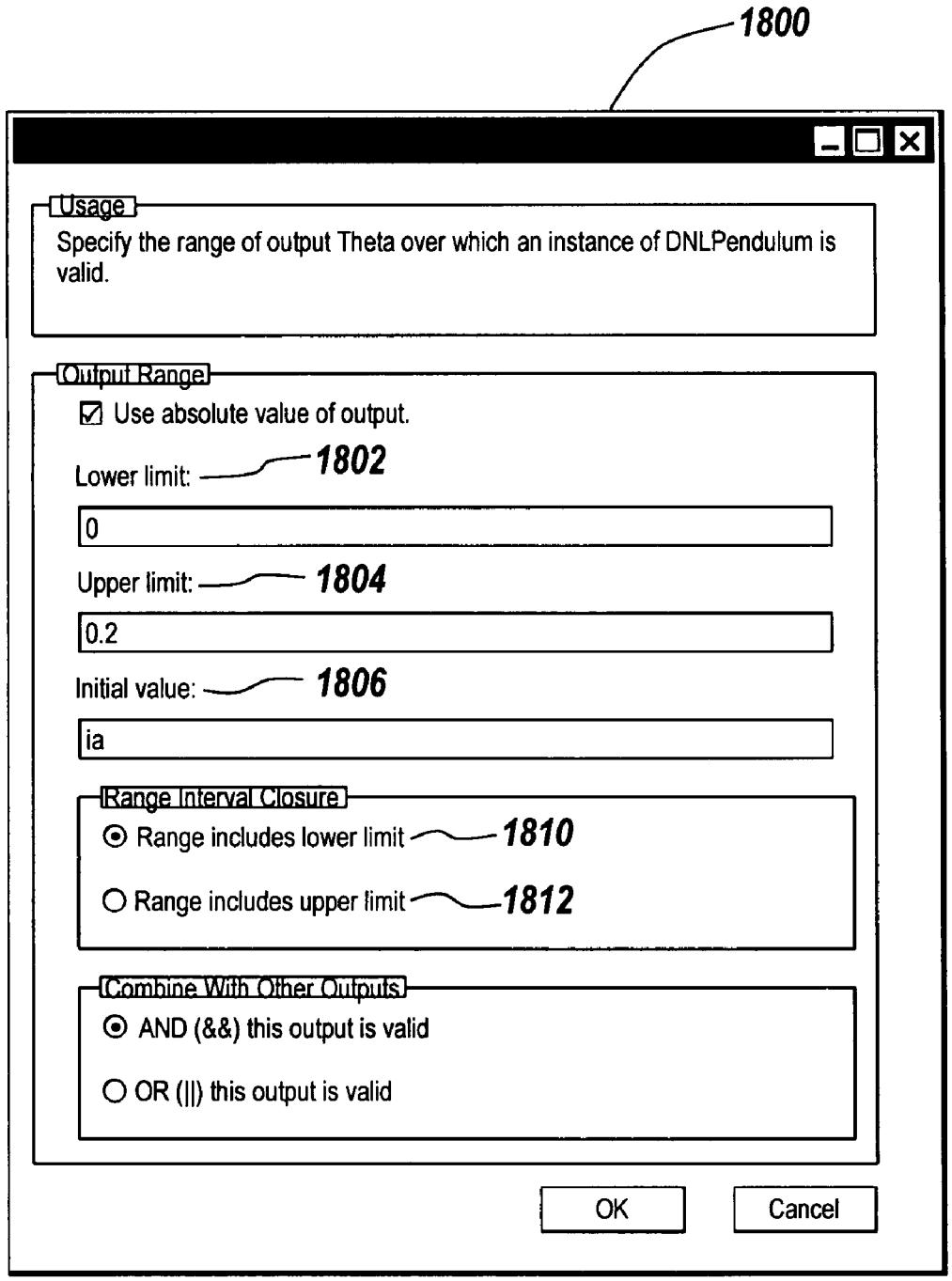
FIG. 18 is an exemplary user interface that is provided upon the selection of the option provided in the menu of FIG. 17.

FIG. 18 is an example of a user interface 1800 that allows a user to specify an output range for an instance of a damped non-linear pendulum class. The user interface 1800 can allow a user to enter a value for a lower limit 1802, an upper limit 1804 and an initial value 1806. During simulation, when the output of the pendulum model is outside of the specified limits, the damped linear pendulum class is no longer valid and the simulation switches to another instance of a class of graphical objects that is valid for the current output. The user may also specify whether the lower and/or upper limits are included in the range by select an option 1810 and/or an option 1812, respectively. In the case where an instance of a class of graphical objects has more than one output, the user interface 1800 may also allow a user to specify logic that must be met before the switch to another class. For example, the user can specify that both outputs must be outside their range before switching, or the user can specify that if any output is outside of a specified range then the instance is no longer valid.

When no valid class can be selected, the simulation may halt and solicit user input before proceeding. Alternatively, an error can be reported or an otherwise invalid class may be selected. For example, the last active class may continue to be used. A class that is valid in a range of variable values closest to the current values may be selected. A default class can also exist and can be selected and employed when no valid class exists. One skilled in the art will recognize there are a myriad of approaches that can be employed for handling the lack of a valid class, and that the above approaches are merely provided as examples.

Referring again to FIGS. 13 and 14, when the user simulates the graphical model that includes the first symbol 1301 as an element of the graphical model (step 1420), the graphical modeling environment 300 dynamically uses instances of classes of graphical objects that are descendants of the pendulum class of graphical objects represented by the first symbol 1302 to specify any unspecified aspects of the pendulum class of graphical objects, based on dynamic conditions specified by the child classes (step 1430). For example, the linear and non-linear pendulum classes might each specify the range of angles of deflection of a pendulum from the vertical over which it applies. In this case, if a user's model specifies an initial angle of deflection in the nonlinear range, the simulation engine would initially use aspects of the non-linear pendulum class of graphical objects to specify portions of the pendulum class of graphical objects and then, as the simulation progresses, switch back and forth between instances of the non-linear and linear pendulum classes as the simulated pendulum moves into and out of its linear range of operation. The switching between instances can be implemented, for example, by using a fading scheme that gradually reduces an output that is computed using one class, while an output that is computed of the other class is gradually increased.

During the simulation, the aspects of the pendulum class of graphical objects can change dynamically from the non-linear pendulum class of graphical objects to the linear pendulum class of graphical objects. The class of graphical objects may change dynamically because, for example, a parameter that is set in the objects of the graphical model specifies the change, the values of the signals in the simulation may indicate that the pendulum is operating in the linear region (e.g., the linear class and the nonlinear class may provide a range for which the pendulum operates in the linear and non-linear regions) or the user may have specified a point in the simulation that the change should occur (e.g., the user can specify a particular time in the simulation). In this manner, a class of graphical objects that is inserted into a executable graphical model can be dynamically specified using the descendant classes of graphical objects of the class of graphical objects that is inserted into the graphical model.

The graphical modeling environment 300 provides a way for a user to define states of a class of graphical objects that descendant classes can inherit. In particular, the mask of a class could declare named states corresponding to variables in the mask workspace that in turn references data objects that define the data type, initial value, and current value of each state. The user can associate these state variables with the states of the elements of the graphical object by assigning the same state name in a state pane of the parameter dialog box of the graphical object. Elements with states in the graphical object would update the values of the associated state variables during simulation. The user can specify a state variable as the initial value of the state. When one instance of a polymorphic set of classes replaces another during the simulation, the simulation engine initializes each state of the new instance with the current value of the inherited state variable that has the same name.

For example, a user can define the abstract pendulum class of graphical objects with two children classes, the linear pendulum class and the non-linear pendulum class. Furthermore, the mask of the pendulum class can define as state variables, an angle, an angular velocity, and an angular acceleration. When the user instantiates the pendulum class in a model with an initial condition that is in a nonlinear range, the simulation begins with an instance of the non-linear pendulum. As the angle state of the simulated pendulum decays into a linear region, the simulation changes to an instance of the linear pendulum class. The instance of the linear pendulum class inherits the current values of the angle, angular velocity, and angular acceleration states from the instance of the non-linear pendulum class.

Effectively, the first symbol 1301 represents a family of concrete subclasses of an abstract root class that collectively define the behavior of a pendulum over a range of angles that none of the classes alone can model both efficiently and accurately. Moreover, the family of classes provides all the information needed by the modeling environment, given the abstract root class, to select an instance of the subclass best suited in terms of accuracy and efficiency for modeling a specific portion of the pendulum's operating range. As a result, the only element that a user needs to include in a model in order to simulate a pendulum accurately and efficiently over its entire operating range is the symbol representing the root element 1301.

In general, as this example illustrates, the feature of polymorphism allows a user to create abstract (i.e., high-level) models of dynamic systems that are as accurate and efficient to simulate as concrete models but take less time to create and are easier to understand and maintain. Similarly, polymorphism facilitates creation of self-configuring models of families of dynamic systems, such as a model of a family of automobiles having differing engine, transmission, and braking options. Selecting a set of options causes the model to configure itself to simulate a vehicle having the selected set of options.

The classes of graphical objects that define the dynamically determined behavior of an abstract class used in a graphical model can be compiled at the same time as the graphical model is compiled or the objects can be compiled as needed during the simulation of the graphical model. If the objects are compiled as needed, the simulation of the graphical model may pause until the compilation of the required class of graphical objects is complete.

Before it can execute a graphical model, a modeling environment must compile the model. Upon compiling a graphical model that contains instances of user-defined classes, the graphical modeling environment 300 checks the class packages referenced by the graphical model to ensure that the class definitions are consistent, such that all connection interfaces are correctly implemented. If there is an inconsistency, the graphical modeling environment 300 can display an error. This checking allows the graphical modeling environment 300 to detect errors that may occur if the user adds a port to the connection interface of a base class and neglects to provide an internal connection for that port in a descendant class.

Figure 19:
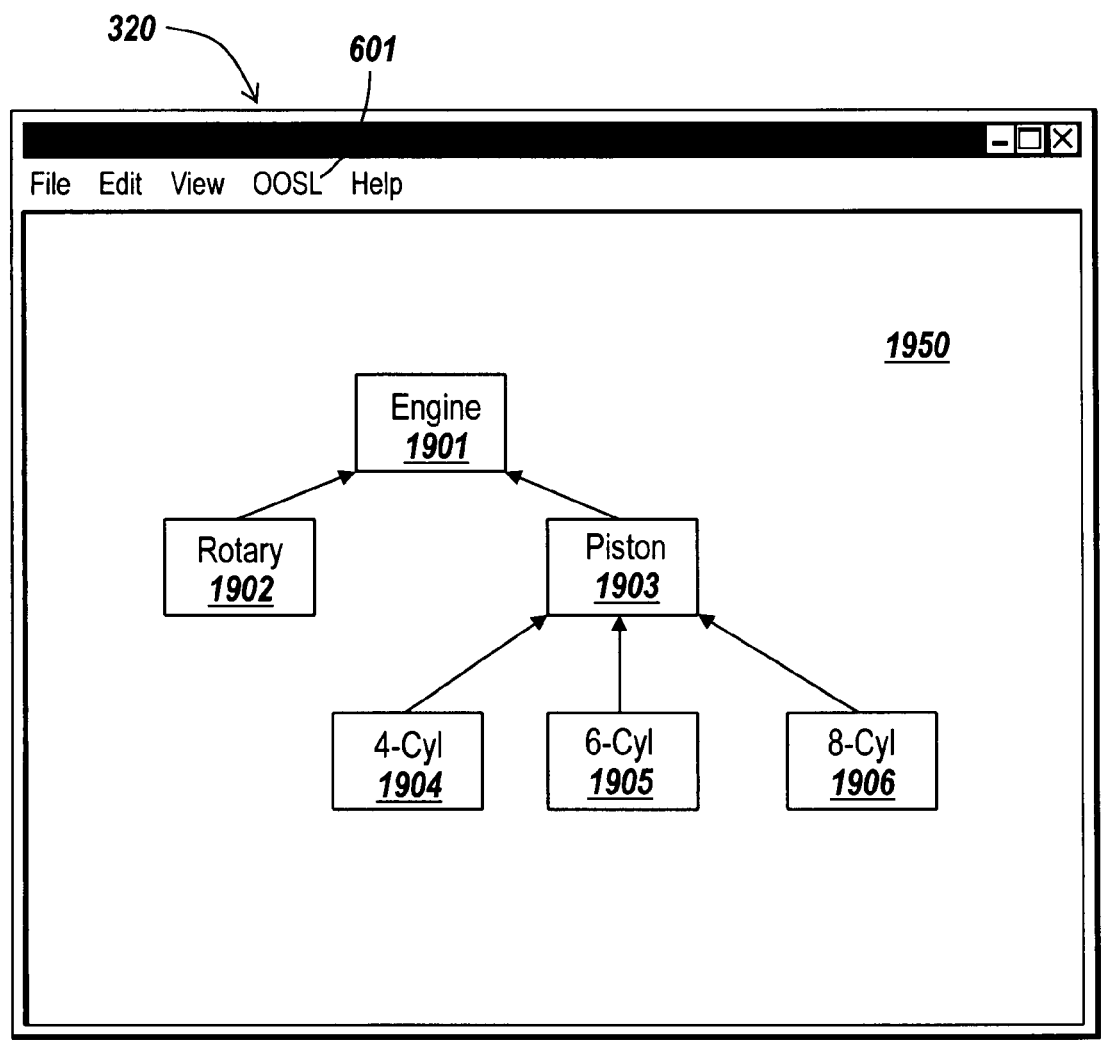
FIG. 19 depicts an exemplary hierarchy of classes of graphical objects in the package editor for an engine.

FIG. 19 depicts another example of a hierarchy of classes of graphical objects 1950 in the package editor 320. The hierarchy includes an engine class of graphical objects as a root class as represented by symbol 1901. Classes of engine types represent children classes of the engine class. A symbol 1902 represents a rotary engine class and a symbol 1903 represents a piston engine class. The piston engine class has further descendant classes of graphical objects that represent a number of cylinders for a piston engine. The children classes of the piston class are a 4-cylinder class, a 6-cylinder class, and an 8-cylinder class represented by symbols 1904-1906, respectively.

Figure 20A:
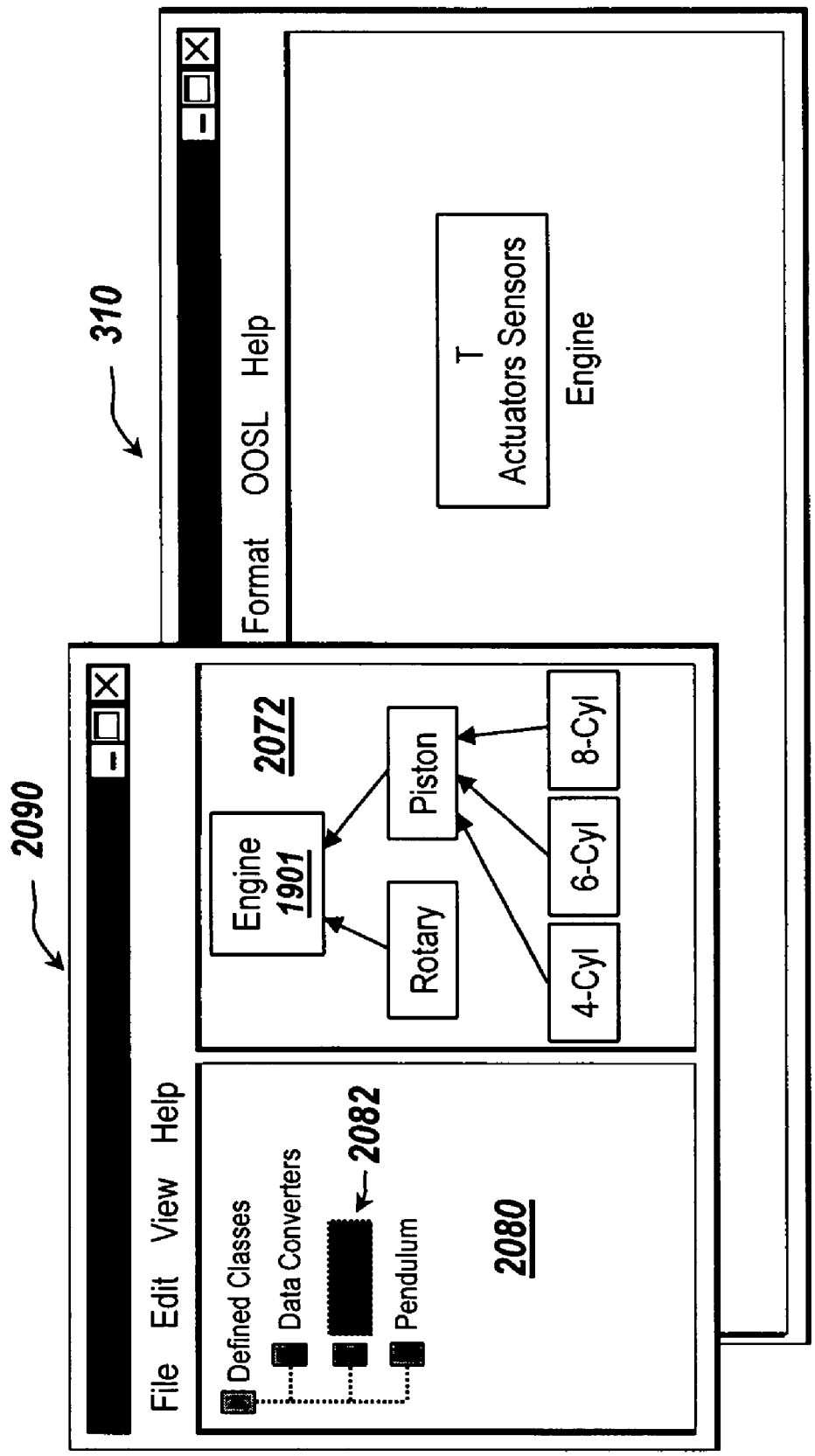
FIG. 20A depicts an exemplary graphical modeling interface for instantiating a user-defined class of graphical objects for a hierarchy of user-defined classes of graphical objects.

The user can instantiate the classes of graphical objects in the hierarchy of graphical objects 1950 in a graphical model. FIG. 20A depicts a graphical representation on the modeling interface 310 and a class manager 2090. The user can select a user-defined hierarchy of user-defined classes of graphical objects from a list of hierarchies of classes 2080 in the class manager 2090. Upon selecting a hierarchy of classes, the symbols that represent the classes of graphical objects in the hierarchy are displayed. The user can select a symbol and drag-and-drop the symbol into the modeling interface 310. For example, the user can select the hierarchy of classes for an engine 2082 and the classes in the hierarchy 2072 are displayed. The user can select the engine symbol 1901 and place it in the modeling interface 310. The user can continue adding classes of graphical objects to the modeling interface or can add elements to form a graphical model of a dynamic system.

Figure 20B:
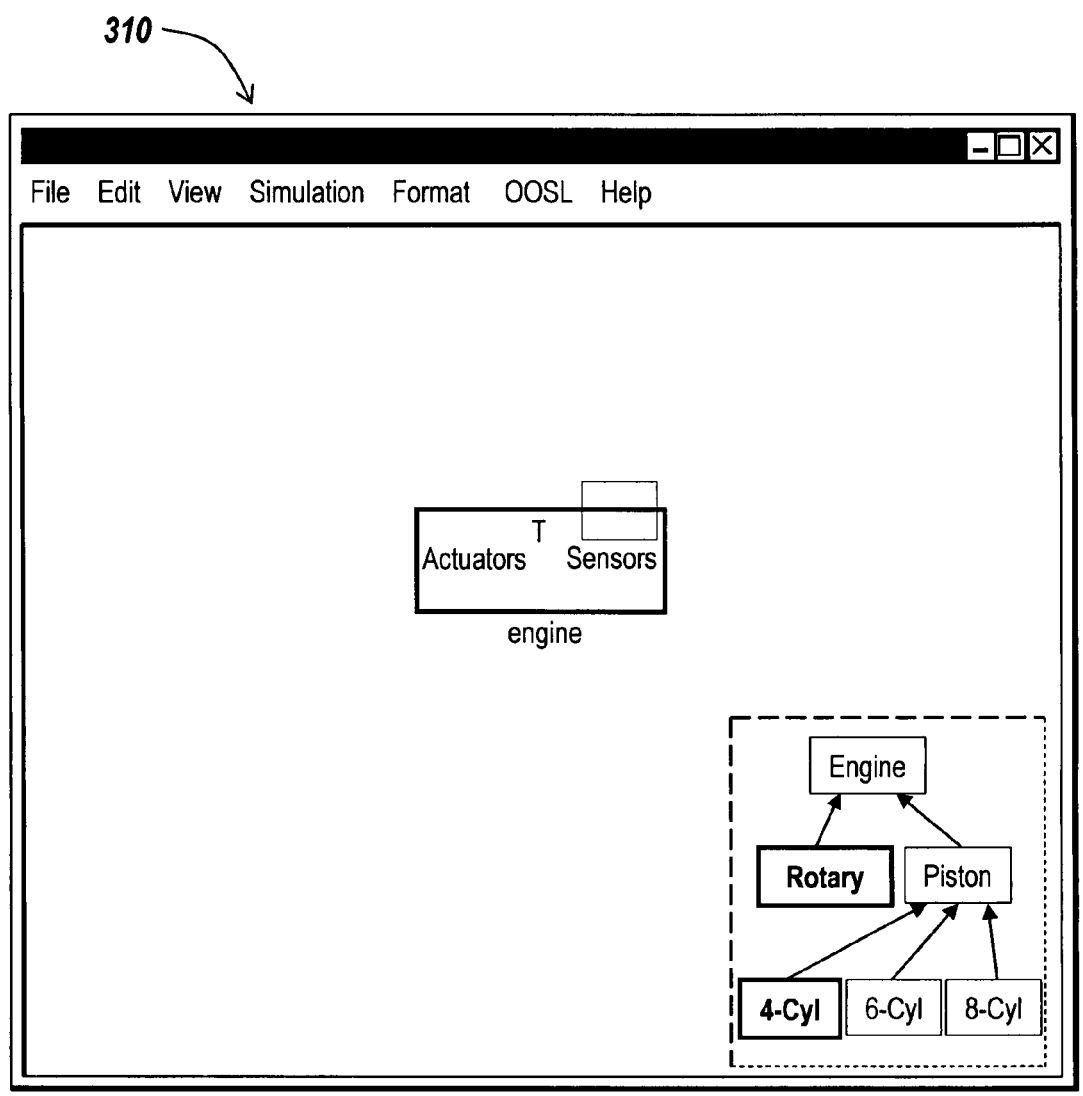
FIG. 20B depicts an exemplary graphical modeling interface that shows descendant classes of graphical objects by reference.

After the symbol 1901 is placed in the modeling interface 310, the descendant classes of graphical objects may be shown by reference on the canvas in the modeling interface 310, as depicted in FIG. 20B. A user can navigate to the descendant classes by clicking the label that is shown by reference.

Figure 20C:
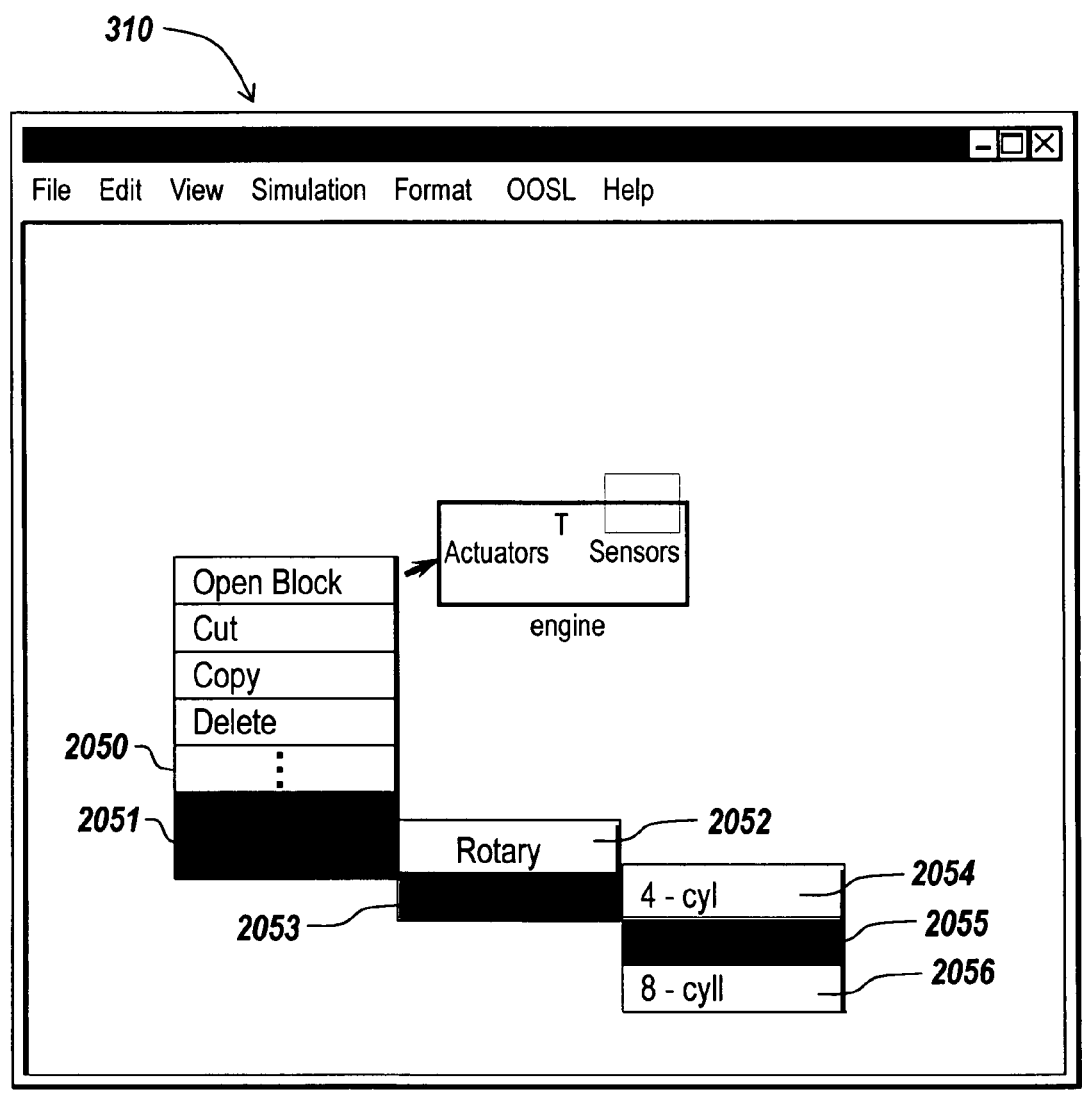
FIG. 20C depicts another exemplary graphical modeling interface where classes of graphical objects are depicted upon right-clicking an instance of a graphical object.

Further, the modeling interface may allow a user to right-click on the canvas of the modeling interface 310 may bring up a hierarchical menu 2050 with descendant classes, as shown in FIG. 20C. A user can navigate to a descendant class by selecting various options from the hierarchical menu 2050. For example, the hierarchical menu may have a "Block Choice" option 2051 that allows the user to view options for choosing a descendant class of graphical object. In this example, the hierarchical menu 2050 provides a "Rotary" option 2052 and a "Piston" option 2053, where the options 2052 and 2053 represent possible descendant class of the engine class. Upon selection of one of the options 2052 or 2053, the hierarchical menu 2050 may display further descendant class of graphical objects that can be selected. In this case, the user may select the "Piston" class option 2053 and the descendant classes of the "Piston" class of graphical objects may be displayed. For example, a "4-cyl" class option 2054, a "6-cyl" class option 2055 and a "8-cyl" class option 2056 may be displayed. The user may select a descendant class in the hierarchical menu 2050 to insert an instance of the descendant class into the graphical model.

Figure 21:
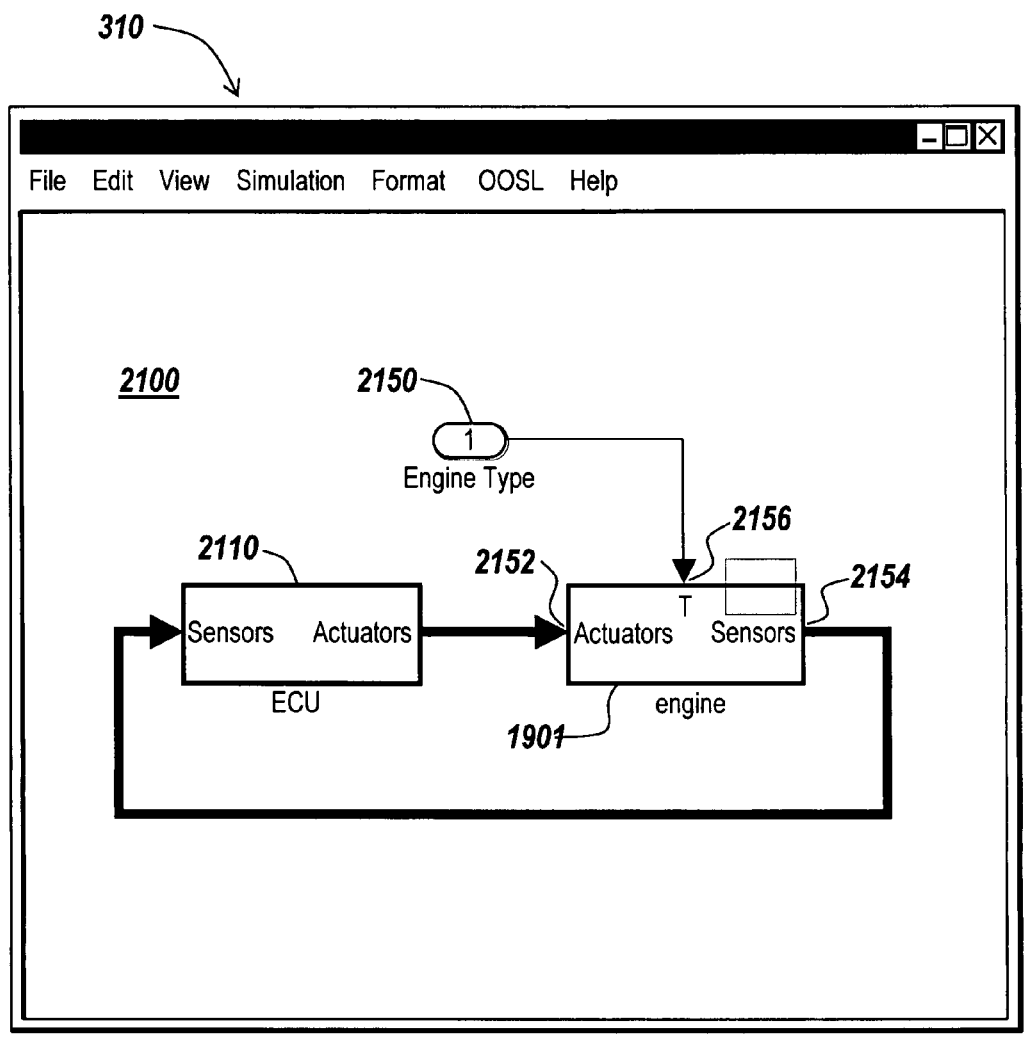
FIG. 21 depicts an exemplary graphical model that instantiates a class of graphical objects in a model of an engine system.

FIG. 21 depicts a graphical model 2100 where the engine class has been inserted into a graphical model of an engine system. The graphical model of the engine system includes an element 2110 that represents an engine control unit (ECU), the symbol 1901 implemented as an element and an engine type node 2150. The engine class has a connection interface that has an input bus 2052, an output bus 2154, and an input port 2156. An output of the element 2110 connects to the input bus 2152 of the engine class on the symbol 1901 and the output bus 2154 of the engine class connects to the input of the element 2010. The engine type node 2150 connects to the input port 2156 of the engine class.

At the beginning of simulation, the engine type node 2150 may provide a signal to the engine class indicating the type of engine to be used for the simulation. For example, a signal from the engine type node 2150 can provide a signal that specifies that the rotary engine type should be simulated, thereby, specifying aspects of the rotary engine class represented by the symbol 1902. Further, during simulation engine type node 2150 can provide a subsequent signal that specifies that the piston engine type should be used, thereby, specifying aspects of the piston engine class represented by symbol 1903. The signals provided by the engine type node 2150 could also specify the number of cylinders that are to be simulated when the piston engine class is specified. For each case, the engine class of graphical objects may be specified to be any of the descendant classes of graphical objects during the simulation.

In addition, the various embodiments of the present invention allow a class of graphical objects to be specified based on a number of inputs received by the class of graphical objects, a number of outputs from the class of graphical objects or the range of values of the signals that are input or output from the class of graphical objects. For example, a user may want to simulate an engine system that switches between using 4-cylinders and 8-cylinders depending on an amount of acceleration the engine is required to provide. In this case, the model can be implemented such that when the ECU element 2100 provides a signal that indicates rapid acceleration the model specifies the engine is an 8-cylinder engine using the 8-cylinder class of graphical objects and when the engine is not accelerating the model can dynamically specify the 4-cylinder class of graphical objects.

The present invention may be provided as one or more programs readable by a computing device embodied on or in one or more mediums. The mediums may be, but are not limited to a hard disk, a compact disc, a digital versatile disc, a flash memory card, a PROM (Programmable Read Only Memory), a RAM (Random Access Memory), a ROM (Read Only Memory), a MRAM (magnetoresistive random-access memory), or a magnetic tape. In general, the computer-readable programs may be implemented in any programming language. Some examples of languages that can be used include Python, C, C++, C#, or JAVA. Further, the computer readable programs can be implemented in a hardware description language such as Verilog or VHDL, or any other language that allows prescribing computation. The software programs may be stored on or in one or more mediums as object code.

One skilled in the art will recognize that the use of numbers when describing certain aspects of the embodiments of the present invention are not meant to be limiting and are provided for ease of discussion. For example, when discussing the creation of a first class of graphical objects, one skilled in the art will recognize that the other classes of graphical objects could be created before the first class of graphical objects, and that the term "first" is merely used for identification of a class of graphical objects in the discussion to distinguish the class of graphical objects from other classes of graphical objects in the discussion.

Certain embodiments of the present invention are described above. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for specifying a hierarchy of user-defined classes of graphical objects comprising:
   graphically specifying a first class of graphical objects and a second class of graphical objects in a graphical modeling environment; and
   graphically specifying, in the graphical modeling environment, at least one child class of graphical objects that is a subclass of the first class of graphical objects and the second class of graphical objects,
   wherein a number of inputs and a number of outputs of the at least one child class depend respectively on a number of inputs and a number of outputs of the first class of graphical objects and the second class of graphical objects,
   wherein the number of outputs of the at least one child class is equal to a sum of the number of outputs of the first class of graphical objects and the number of outputs of the second class of graphical objects.

2. The computer-implemented method of claim 1, wherein the at least one child class of graphical objects inherits inputs and outputs from the first class of graphical objects and the second class of graphical objects in a parallel inheritance.

3. The computer-implemented method of claim 1, wherein the number of inputs of the at least one child class is equal to a sum of the number of inputs of the first class of graphical objects and the number of inputs of the second class of graphical objects.

4. The computer-implemented method of claim 3, wherein a position of the first class of graphical objects and the second class of graphical objects in a class hierarchy determines an order in which inputs and outputs of the first class of graphical objects and the second class of graphical objects appear in an interface of the at least one child class.

5. The computer-implemented method of claim 1, wherein the at least one child class of graphical objects inherits inputs and outputs from the first class of graphical objects and the second class of graphical objects in a serial inheritance.

6. The computer-implemented method of claim 1, wherein the number of inputs of the first class of graphical objects is equal to the number of inputs of the second class of graphical objects and the number of outputs of the first class of graphical objects is equal to the number of outputs of the second class of graphical objects.

7. The computer-implemented method of claim 6, wherein inputs of the first class of graphical objects are connected to outputs of the second class of graphical objects.

8. The computer-implemented method of claim 7, wherein inputs of the at least one child class of graphical objects are equal to the inputs of the first class of graphical objects and outputs of the at least one child class of graphical objects are equal to the outputs of the second class of graphical objects.

9. The computer-implemented method of claim 1, wherein the at least one child class of graphical objects inherits inputs and outputs in a mixed mode multiple inheritance, wherein the mixed mode comprises serial inheritance and parallel inheritance.

10. A computing system comprising:
    a processor providing:
      a graphical modeling environment for specifying a hierarchy of user-defined classes of graphical objects, wherein the graphical modeling environment includes:
        a first graphical user interface for defining a class of graphical objects; and
        a second graphical user interface for developing the hierarchy of user-defined classes of graphical objects, wherein the hierarchy of user-defined classes of graphical objects comprises a first class of graphical objects, a second class of graphical objects and a third class of graphical objects that is a child of the first class of graphical objects and the second class of graphical objects, wherein a number of inputs and a number of outputs of the third class depend respectively on a number of inputs and a number of outputs of the first class of graphical objects and the second class of graphical objects,
      wherein the number of outputs of the at least one child class is equal to a sum of the number of outputs of the first class of graphical objects and the number of outputs of the second class of graphical objects.

11. The system of claim 10, wherein the identifying further comprises identifying parallel inheritance with a first visual cue.

12. The system of claim 11, wherein the identifying further comprises identifying serial inheritance with a second visual cue.

13. The computing system of claim 10, wherein the second graphical user interface enables a user to identify aspects of the hierarchy with visual cues.

14. The system of claim 13, wherein the visual cues are created using one or more of highlighting, blinking effect, dashed lines, thin lines, thick lines, shades and colors.

15. The system of claim 13, wherein the hierarchy of user-defined classes of graphical objects comprises a first class of graphical objects and a second class of graphical objects that is a descendant of the first class of graphical objects, wherein at least one of the first class of graphical objects or the second class of graphical objects can be instantiated in an executable graphical model.

16. The system of claim 15, wherein contents of the second class of graphical objects are represented by a relationship diagram.

17. The system of claim 16, wherein the relationship diagram is at least one of a block diagram, a state transition diagram or a flow diagram.

18. The system of claim 17, wherein the relationship diagram includes propagated characteristics.

19. The system of claim 18, wherein a propagated characteristic is one of a sample time or a data type.

20. The system of claim 15, wherein the second user interface depicts a relationship between the first and second class of graphical objects.

21. The system of claim 20, wherein the second class of graphical objects inherits at least one aspect from the first class of graphical objects and the relationship depicted is an inheritance relationship.

22. The system of claim 13, wherein the first user interface enables a user to develop a graphical model that includes an instance of at least one of the first or second classes of graphical objects.

23. The system of claim 22, wherein the system further comprises:
a compiler to compile a graphical model implemented in the graphical modeling environment and that includes at least the first class of graphical objects; and
a simulator for initiating execution of the compiled graphical model.

24. The system of claim 23, wherein the simulator propagates characteristics in the graphical model.

25. The system of claim 23, wherein the simulator includes an interface for dynamically specifying the instance as of one of the first class of graphical objects or the at least one descendant class of graphical objects in the graphical model based on one of an input to an instance of the first class of graphical objects, an output from an instance of the first class of graphical objects, a state variable of an instance of the first class of graphical objects, or a simulation parameter or a user-specified parameter.

26. The system of claim 13, wherein the first user interface enables a user to graphically modify at least one of the first or second classes of graphical objects.

27. The system of claim 13, wherein the graphical modeling environment further comprises:
a symbol editor to edit a symbol that represents each class of graphical objects in the user-defined hierarchical class of graphical objects; and
a dialog box designer for creating a dialog box for entering instance-specific values of a set of parameters for each instance of a class of graphical objects in the hierarchy.

28. A non-transitory computer-readable medium storing instructions for generating a hierarchy of user-defined classes of graphical objects in a graphical modeling environment, the medium comprising:
instructions for graphically specifying a root class of graphical objects in the graphical modeling environment wherein the root class of graphical objects comprises at least a first class of graphical objects and a second class of graphical objects;
wherein a number of inputs and a number of outputs of the client class depend respectively on a number of inputs and a number of outputs of the first class of graphical objects and the second class of graphical objects;
instructions for graphically specifying, in the graphical modeling environment, a child class of graphical objects that is a subclass of the root class of graphical objects for the hierarchy of classes of graphical objects;
instructions for graphically specifying a definition of a behavior of at least one of the root class of graphical objects or the child class of graphical objects; and
instructions for instantiating at least one of the root class or the child class of graphical objects in an executable graphical model using the definition wherein the number of outputs of the child class is equal to a sum of the number of outputs of the first class of graphical objects and the number of outputs of the second class of graphical objects.

29. The medium of claim 28, wherein graphically specifying the root class of graphical objects comprises generating a class of graphical objects as the root class of graphical objects.

30. The medium of claim 28, wherein graphically specifying the root class of graphical objects comprises specifying an existing class of graphical objects as the root class of graphical objects.

31. The medium of claim 28, further comprising:
instructions for displaying a hierarchical menu to a user, wherein the hierarchical menu displays one or more instances of each class in the hierarchy of classes of graphical objects at different levels.

32. The medium of claim 31, wherein the user inserts one or more instances of a class of graphical objects in the executable graphical model.

33. A non-transitory computer-readable medium holding instructions for generating a hierarchy of user-defined classes of graphical objects in a graphical modeling environment, the instructions comprising:
graphically specifying:
a first class of graphical objects,
a second class of graphical objects;
a descendant class of graphical objects that is a subclass of the first class of graphical objects for the hierarchy of classes of graphical objects, and
a definition of a behavior of at least one of the first class of graphical objects or the descendant class; and
instantiating the first class or the descendant class in an executable graphical model using the definition wherein a number of inputs and a number of outputs of the descendant class depend respectively on a number of inputs and a number of outputs of the first class of graphical objects and the second class of graphical objects,
wherein the number of outputs of the descendant class is equal to a sum of the number of outputs of the first class of graphical objects and the number of outputs of the second class of graphical objects.

34. The medium of claim 33, wherein the instructions further comprise:
compiling a graphical model that includes the first class of graphical objects;
initiating execution of the graphical model; and
dynamically specifying one of the first class of graphical objects or the at least one descendant class of graphical objects after initiating execution.

35. The medium of claim 34, wherein the dynamically specifying is based on at least one of an input to an instance of the first class of graphical objects, an output from an instance of the first class of graphical objects, a state variable of an instance of the first class of graphical objects, or a simulation parameter or a user-specified parameter.

36. The medium of claim 33, wherein the instructions further comprise:
specifying a number of connections on a connection interface of at least one of the classes of graphical objects in the hierarchy of user-defined classes of graphical objects; and
specifying a data type for each connection on the connection interface.

* * * * *